United States Patent
Chen et al.

(10) Patent No.: US 11,792,329 B2
(45) Date of Patent: Oct. 17, 2023

(54) CONFERENCE CALL AND MOBILE COMMUNICATION DEVICES THAT PARTICIPATE IN A CONFERENCE CALL

(71) Applicant: DSP GROUP LTD., Herzliya (IL)

(72) Inventors: Yaakov Chen, Rishon Le-Tzion (IL); Adoram Erell, Herzelia (IL); Dmitri Lvov, Ramat Hasharon (IL)

(73) Assignee: DSP GROUP LTD.

( * ) Notice: Subject to any disclaimer, the term of this patent is extended or adjusted under 35 U.S.C. 154(b) by 0 days.

(21) Appl. No.: 17/812,168

(22) Filed: Jul. 12, 2022

(65) Prior Publication Data

US 2022/0377181 A1 Nov. 24, 2022

Related U.S. Application Data

(63) Continuation of application No. 15/454,012, filed on Mar. 9, 2017, now Pat. No. 11,425,261.

(60) Provisional application No. 62/306,101, filed on Mar. 10, 2016.

(51) Int. Cl.
*H04M 9/08* (2006.01)
*H04B 3/23* (2006.01)
*G10L 21/0208* (2013.01)

(52) U.S. Cl.
CPC .............. *H04M 9/082* (2013.01); *H04B 3/23* (2013.01); *G10L 2021/02082* (2013.01)

(58) Field of Classification Search
CPC . H04M 9/082; H04B 3/23; G10L 2021/02082
See application file for complete search history.

(56) References Cited

U.S. PATENT DOCUMENTS

| | | | | |
|---|---|---|---|---|
| 3,771,062 A | * | 11/1973 | Burnsweig | H04N 9/89 386/E9.06 |
| 4,189,677 A | * | 2/1980 | Cooper | H04B 1/69 375/E1.001 |
| 5,734,724 A | * | 3/1998 | Kinoshita | H04M 3/56 370/266 |
| 5,848,146 A | * | 12/1998 | Slattery | H04M 9/082 379/406.01 |
| 6,853,626 B1 | | 2/2005 | Farhang-Boroujeny | H04B 3/23 370/286 |
| 7,302,652 B2 | | 11/2007 | Chen | G06F 30/30 716/132 |

(Continued)

*Primary Examiner* — Lisa Hashem
(74) *Attorney, Agent, or Firm* — Paradice & Li LLP

(57) ABSTRACT

A first mobile communication device that includes a first microphone, a first speaker, and a first delay unit. The first microphone is configured to (i) receive, during a conference call, a first user first microphone signal from a first user, and (ii) output a first microphone digital signal to the first delay unit. The first user first microphone signal represents audio content outputted by the first user. The first delay unit is configured to delay, by a delay period, the first microphone digital signal to provide a delayed first user first device digital signal. The first mobile communication device is configured to output, to a mixer, the delayed first user first device digital signal. The delay period is determined based on measurements executed by at least one mobile communication device out of the first mobile communication device, a second mobile communication device and a third mobile communication device.

20 Claims, 30 Drawing Sheets

(56) References Cited

U.S. PATENT DOCUMENTS

| | | | | |
|---|---|---|---|---|
| 7,853,007 B2* | 12/2010 | Tittel | ............ | H04M 3/56 455/518 |
| 7,916,671 B1 | 3/2011 | Zortea | ............ | H04L 27/362 370/286 |
| 8,184,801 B1 | 5/2012 | Hamalainen | ............ | H04M 9/08 379/406.03 |
| 8,189,766 B1 | 5/2012 | Klein | ............ | H04M 9/085 379/406.07 |
| 8,259,926 B1 | 9/2012 | Avendano | ............ | H04M 9/082 379/406.02 |
| 8,340,278 B2 | 12/2012 | Gowreesunker | ............ | H04B 3/23 379/406.03 |
| 8,379,823 B2* | 2/2013 | Ratmanski | ............ | H04M 3/56 379/202.01 |
| 8,520,821 B2 | 8/2013 | Alexandrov | ............ | H04L 65/4053 379/202.01 |
| 8,908,881 B2 | 12/2014 | Sato | ............ | G10H 1/0091 84/625 |
| 9,031,262 B2* | 5/2015 | Silfvast | ............ | G10H 1/18 381/98 |
| 9,053,697 B2 | 6/2015 | Park | ............ | G10L 21/0208 |
| 9,118,396 B2 | 8/2015 | Gudem | ............ | H04B 1/44 |
| 10,594,358 B2 | 3/2020 | Cheung | ............ | G01S 7/52 |
| 11,070,397 B2 | 7/2021 | Hemo | ............ | H04L 25/0228 |
| 11,079,471 B2 | 8/2021 | Guarin Aristizabal | ............ | G01S 13/931 |
| 11,363,083 B2* | 6/2022 | Kegel | ............ | H04L 65/4061 |
| 2011/0019810 A1 | 1/2011 | Alexandrov | ............ | H04L 65/4038 379/204.01 |
| 2011/0076939 A1 | 3/2011 | Sato | ............ | H01Q 21/0025 455/39 |
| 2012/0128168 A1 | 5/2012 | Gowreesunker | ............ | H04M 9/082 381/66 |
| 2012/0276961 A1 | 11/2012 | Momma | ............ | G10L 21/0208 455/570 |
| 2012/0288079 A1 | 11/2012 | Burnett | ............ | G10L 21/0208 379/202.01 |
| 2014/0329511 A1 | 11/2014 | Vesa | ............ | H04M 3/569 455/416 |
| 2015/0011266 A1 | 1/2015 | Feldt | ............ | H04M 9/082 455/570 |
| 2016/0012813 A1 | 1/2016 | Every | ............ | G10K 11/175 381/66 |
| 2016/0127815 A1 | 5/2016 | Ookuri | ............ | H04R 1/06 381/119 |
| 2017/0187415 A1 | 6/2017 | Choi | ............ | H04B 1/0475 |
| 2018/0048768 A1 | 2/2018 | Spittle | ............ | H04M 9/082 |
| 2019/0379388 A1 | 12/2019 | Gao | ............ | H03M 1/0612 |
| 2020/0381009 A1 | 12/2020 | Penniman | ............ | G10L 25/84 |
| 2021/0392445 A1 | 12/2021 | Oosugi | ............ | G10K 11/17881 |

* cited by examiner

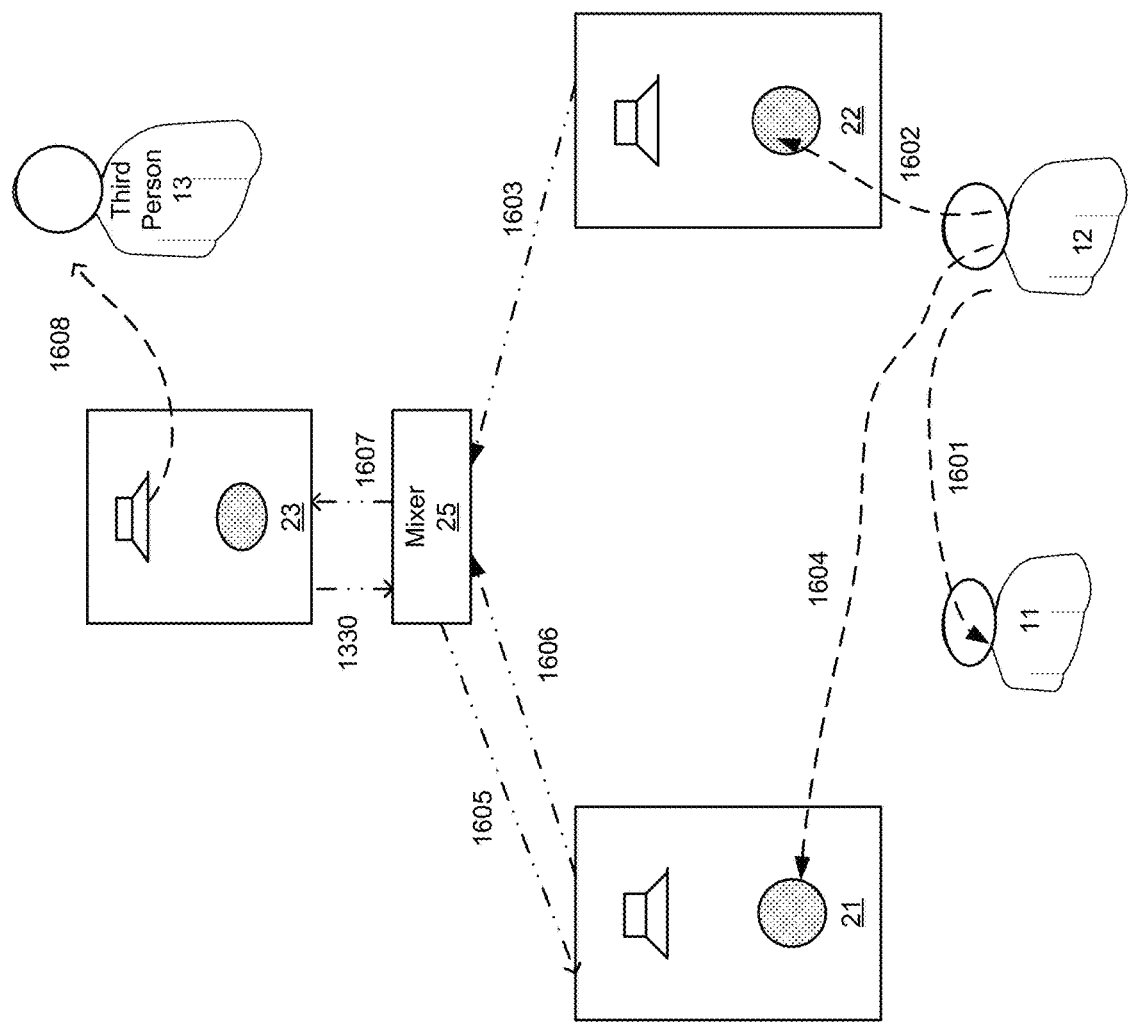

CONFERENCE CALL AND MOBILE COMMUNICATION DEVICES THAT PARTICIPATE IN A CONFERENCE CALL

CROSS REFERENCE

This application is a continuation of U.S. patent application Ser. No. 15/454,012 filing date Mar. 9, 2017 which claims priority from U.S. patent provisional patent Ser. No. 62/306,101 filing date Mar. 10, 2016. Both patent applications are incorporated herein by reference.

BACKGROUND

There is a growing need to allow people to conduct conference calls in a cost-effective manner.

SUMMARY

Methods, systems, and mobile communication devices as illustrated in the specification and/or the claims.

There may be provided a first mobile communication device that includes a first microphone, a first speaker and a first delay unit. The first microphone is configured to (i) receive, during a conference call, a first user first microphone signal from a first user, and (ii) output a first microphone digital signal to the first delay unit; wherein the first user first microphone signal represents audio content outputted by the first user. The first delay unit is configured to delay, by a delay period, the first microphone digital signal to provide a delayed first user first device digital signal. The first mobile communication device is configured to output, to a mixer, the delayed first user first device digital signal. The delay period is determined based on measurements executed by at least one mobile communication device out of the first mobile communication device, a second mobile communication device and a third mobile communication device. The mixer is in communication with the first mobile communication device, the second mobile communication device, and the third mobile communication device.

There may be provided a method for participating in a conference call, the method may include receiving a first user first microphone signal from a first user, by a first microphone of a first mobile communication device and during the conference call; outputting, by the first microphone, a first microphone digital signal to a first delay unit of the first mobile communication device; wherein the first user first microphone signal represents audio content outputted by the first user; delaying the first microphone digital signal, by the first delay unit and by a delay period, to provide a delayed first user first device digital signal; wherein the delay period is determined based on measurements executed by at least one mobile communication device out of the first mobile communication device, a second mobile communication device and a third mobile communication device; and outputting, by the first mobile communication device, the delayed first user first device digital signal to a mixer; wherein the mixer is in communication with the first mobile communication device, the second mobile communication device, and the third mobile communication device.

There may be provided a non-transitory computer readable medium that stores instructions for participating in a conference call, the instructions causing a first mobile communication device to: receive by a first microphone of the first mobile communication device, during the conference call, a first user first microphone signal from a first user; output, by the first microphone, a first microphone digital signal to a first delay unit of the first mobile communication device; wherein the first user first microphone signal represents audio content outputted by the first user; delay, by the first delay unit and by a delay period, the first microphone digital signal to provide a delayed first user first device digital signal; wherein the delay period is determined based on measurements executed by at least one mobile communication device out of the first mobile communication device, a second mobile communication device and a third mobile communication device; and output, by the first mobile communication device, the delayed first user first device digital signal to a mixer; wherein the mixer is in communication with the first mobile communication device, the second mobile communication device, and the third mobile communication device.

BRIEF DESCRIPTION OF THE DRAWINGS

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

FIG. 12A illustrates a second person that talks during conference call, a mixer, three devices, and various signals generated during the conference call according to an embodiment of the invention.

DETAILED DESCRIPTION OF THE DRAWINGS

Figure 1A:
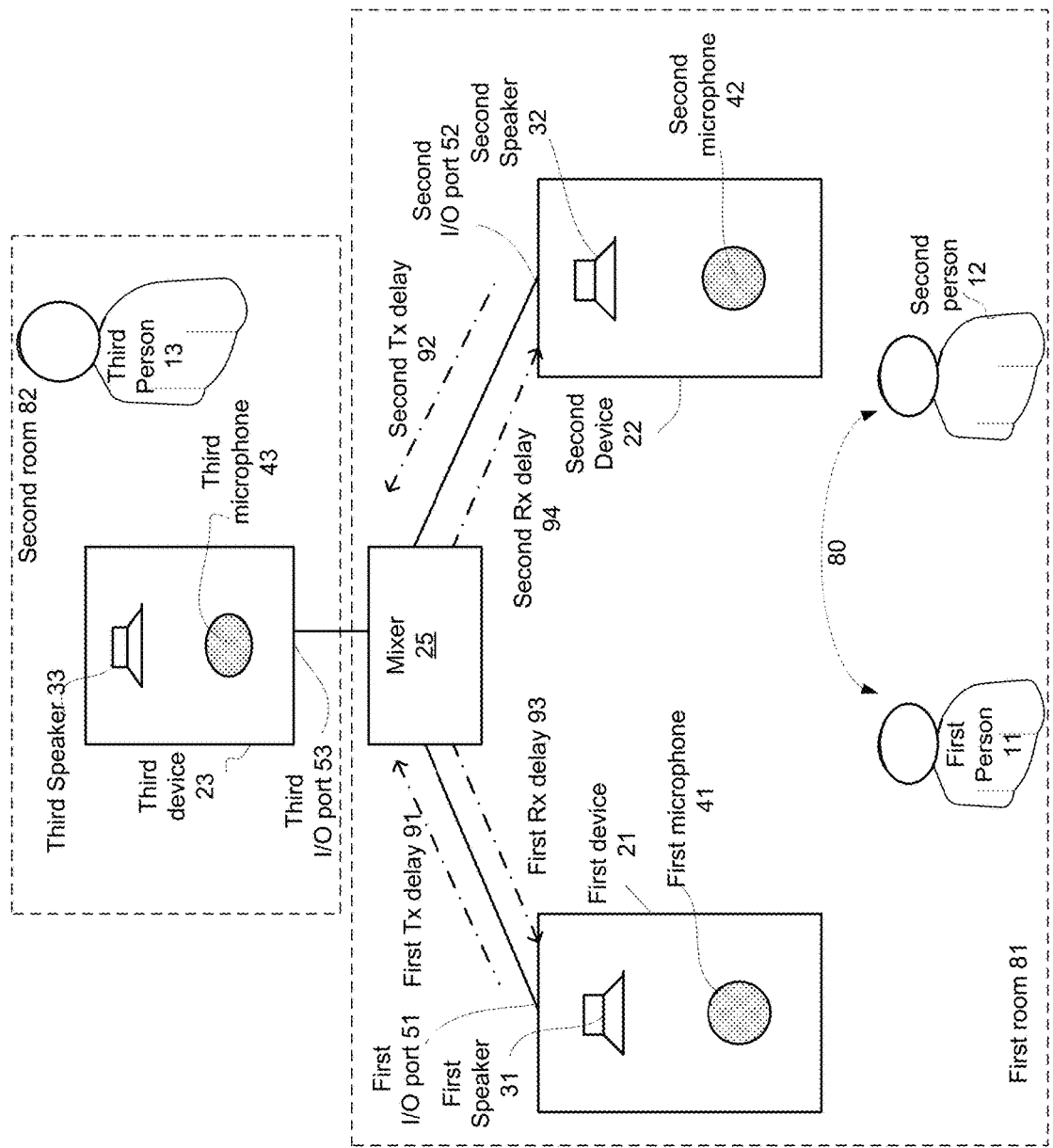
FIG. 1A illustrates three persons that participate in a conference call, a mixer and three devices according to an embodiment of the invention.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "comprising" is synonymous with (means the same thing as) "including," "containing" or "having" and is inclusive or open-ended and does not exclude additional, unrecited elements or method steps.

The term "consisting" is a closed (only includes exactly what is stated) and excludes any additional, unrecited elements or method steps.

The term "consisting essentially of" limits the scope to specified materials or steps and those that do not materially affect the basic and novel characteristics.

In the claims and specification any reference to the term "comprising" (or "including" or "containing") should be applied mutatis mutandis to the term "consisting" and should be applied mutatis mutandis to the phrase "consisting essentially of".

In the claims and specification any reference to the term "consisting" should be applied mutatis mutandis to the term "comprising" and should be applied mutatis mutandis to the phrase "consisting essentially of".

In the claims and specification any reference to the phrase "consisting essentially of" should be applied mutatis mutandis to the term "comprising" and should be applied mutatis mutandis to the term "consisting".

Any reference in the specification to a method should be applied mutatis mutandis to a system capable of executing the method.

Any reference in the specification to a system should be applied mutatis mutandis to a method that may be executed by the system.

The terms "cancellation", "suppression" are used in an interchangeable manner.

The term "substantially" or "about" can refer to an accuracy (or deviation) of any value between 1 and 20 percent.

The term "proximate" may refer to a range of distances that may span, for example, between a fraction of a millimeter and less than 5 centimeters.

Any combination of any components of any of the devices and/or systems illustrated in any of the figures may be provided.

Any device, network, mixer, module and/or system that is illustrated in any of the figures may include additional components, may include alternative components, may include fewer components, may be limited to the components illustrated in the figure or may be essentially limited to the components illustrated in the figure.

There is provide a method for conducting conference calls using mobile devices and an additional mixer and/or network that may convey signals between the mobile device.

The mobile device may be a smartphone. Baby monitor, mobile devices used by public security officers, mobile gaming consoles, but any other mobile device that includes a speaker, a microphone and compensation modules (as illustrated below) can be used for conducting conference calls.

In various figures three persons participate in the conference call, wherein the first and second persons are at the same space/can be heard by each other. This is only for brevity of explanation. The number of participants in a conference call may exceed three. The participants may be arranged in other manners. For example—more than three participants may be located in the same room and more than a single participant may be located at another room.

Some of the various figures illustrates a single talking participant and other figures illustrated two persons that talk. It is noted that any combination of participants may talk at the same time.

In the various figures the first and second persons 11 and 12 are located at the same room and may be referred to as near end participants. The third person is located at another room and is referred to as a far end participant.

It should be noted that the persons may be located at any location—in or out a room.

The following signals illustrate various signals. The signals were named by names that may refer to (a) the person that either generated the signal or resulted in the generation of the signal, (b) the device that either received the signal or generated the signal, (c) a type of the signal—acoustic, digital, leakage or converted signal.

A converted signal may be outputted from a microphone and represents an acoustic signal received by the microphone. The converted signal may have also been processed by one or more modules such as signal processing modules including but not limited to filters and the like.

TABLE 1 lists some of the signals that are illustrated in the drawings. For simplicity of explanation the specification may refer to any of these signals by their full name (listed in the table) or refer to them as "signals" or "signal.

TABLE 1

| # | Name | remark |
|---|---|---|
| 1011 | First user first microphone acoustic signal | Acoustic signal generated by the first user and received by the first microphone |
| 1012 | First user second microphone acoustic signal | Acoustic signal generated by the first user and received by the second microphone |
| 1013 | First user second device acoustic leakage signal | Acoustic signal generated by the first microphone as a result from a digital leakage signal from the second device through the mixer and to the first device, in response to the acoustic signal generated by the first user |
| 1014 | First user first device acoustic leakage signal | Acoustic signal generated by the second microphone as a result from a digital leakage signal from the first device through the mixer and to the second device, in response to the acoustic signal generated by the first user |
| 1031 | Third user first speaker acoustic signal | Acoustic signal generated by the first speaker in response to the acoustic signal generated by the third user |
| 1032 | Third user second speaker acoustic signal | Acoustic signal generated by the second speaker in response to the acoustic signal generated by the third user |
| 1041 | Third user first device echo | Echo of the first device (from speaker to microphone) in response to the acoustic signal generated by the third user |
| 1041' | Converted third user first device echo | Signal 1041 after conversion to an electrical signal by first microphone |
| 1042 | Third user second device echo | Echo of the second device (from speaker to microphone) in response to the acoustic signal generated by the third user |
| 1043 | First user first device echo | Echo of the first device (from speaker to microphone) in response to a digital leakage signal from the second device through the mixer and to the first device, leakage resulting from response to the acoustic signal generated by the first user |
| 1044 | First user second device echo | Echo of the second device (from speaker to microphone) in response to a digital leakage signal from the first device through the mixer and to the second device, leakage resulting from response to the acoustic signal generated by the first user |
| 1051 | Third user first cross echo | Cross echo (from second speaker to first microphone) in response to the acoustic signal generated by the third user |
| 1052 | Third user second cross echo | Cross echo (from first speaker to second microphone) in response to the acoustic signal generated by the third user |

TABLE 1-continued

| # | Name | remark |
|---|---|---|
| 1052' | Converted third user second echo | Signal 1052 after conversion to an electrical signal by first microphone |
| 1053 | First user first device cross echo | Echo from the first device that is received by the second device and results from digital leakage from the second device via the mixer and to the first device, the echo results from the acoustic signal generated by the first user |
| 1054 | First user second device cross echo | Echo from the second device that is received by the first device and results from digital leakage from the first device via the mixer and to the second device, the echo results from the acoustic signal generated by the first user |
| 1111 | First user first device digital signal | Digital signal outputted by the first device in response to the acoustic signal generated by the first user. |
| 1112 | First user second device digital signal | Digital signal outputted by the second device in response to the acoustic signal generated by the first user |
| 1131 | Third user first device input signal | Digital signal outputted by the mixer and received by the first device in response to the acoustic signal generated by the third user |
| 1131' | Converted third user first device input signal | Signal 1131 after conversion to an electrical signal by first microphone |
| 1132 | Third user second device input signal | Digital signal outputted by the mixer and received by the second device in response to the acoustic signal generated by the third user |
| 1141 | First user second digital leakage signal | Digital leakage signal from the first device through the mixer and to the second device, in response to the acoustic signal generated by the first user |
| 1142 | First user first digital leakage signal | Digital leakage signal from the second device through the mixer and to the first device, in response to the acoustic signal generated by the first user |
| 1310 | First user mixed digital signal | Digital signal outputted by the mixer in response to the acoustic signal generated by the first user |
| 1330 | Third user third device digital signal | Digital signal outputted by the third device in response to in response to the acoustic signal generated by the third user |
| 1335 | Third user connecting network digital signal | Digital signal outputted by the connecting network in response to in response to the acoustic signal generated by the third user |
| 1336 | First user first device connecting network output signal | Digital signal outputted by the first device to the connecting network in response to the acoustic signal generated by the third user |
| 1337 | First user connecting network output signal | Digital signal outputted by the connecting network in response to the acoustic signal generated by the third user |
| 1410 | First user third device acoustic output signal | Acoustic signal outputted by the third speaker in response to in response to the acoustic signal generated by the first user |
| 1430 | Third user third microphone acoustic signal | Acoustic signal generated by the third user and received by the third microphone |
| 1501 | Third user first device near end network digital signal | Digital signal outputted by the first device to the near end network in response to the acoustic signal generated by the third user |
| 1502 | Third user near end network second device digital signal | Digital signal outputted by the near end network to the second device in response to the acoustic signal generated by the third user |
| 1511 | First user near end network second device digital signal | Digital signal outputted by the near end network to the first device in response to the acoustic signal generated by the first user |
| 1512 | First user second device near end network digital signal | Digital signal outputted by the second device to the near end network in response to the acoustic signal generated by the first user |
| 1601 | Second user first user acoustic signal | Acoustic signal generated by the second user and received by the first user (for example - without using any device) |
| 1602 | Second user second microphone acoustic signal | Acoustic signal generated by the second user and received by the second microphone |
| 1603 | Second user second device digital signal | Digital signal outputted by the second device in response to the acoustic signal generated by the second user |

TABLE 1-continued

| # | Name | remark |
|---|---|---|
| 1604 | Second user first microphone acoustic signal | Acoustic signal generated by the second user and received by the first microphone |
| 1605 | Second user first digital leakage signal | Digital leakage signal from the second device through the mixer and to the first device, in response to the acoustic signal generated by the second user |
| 1606 | Second user first device digital signal | Digital signal outputted by the first device in response to the acoustic signal generated by the second user. |
| 1607 | Second user mixed digital signal | Digital signal outputted by the mixer in response to the acoustic signal generated by the second user |
| 1608 | Second user third device acoustic output signal | Acoustic signal outputted by the third speaker in response to in response to the acoustic signal generated by the second user |

FIG. 1A illustrates three persons 11, 12 and 13 that participate in a conference call, a mixer 25 and three devices—first device 21, second device 22 and third device 23 that may (or may not) belong to first till third persons 11, 12 and 13 respectively.

First device 21 includes first microphone 41, first speaker 31 and first input output (I/O) port 51. Second device 22 includes second microphone 42 and second speaker 32 and second I/O port 52. Third device 23 includes third microphone 43 and third speaker 33 and third I/O port 53.

An input output (I/O) port may be any communication port—especially not an acoustic port. The I/O port may be, for example a wireless or wired communication port. The I/O port may be used for outputting digital signals and/or representations of digital signals. The I/O port may be used to convey radio frequency (RF) signals and/or other signals.

FIG. 1A also illustrates the acoustic link 80 between first and second persons 11 and 12—as these persons may hear each other without using devices.

There may be delays between the transmission and/or reception of signals between the mixer and each one of the first and second devices.

A difference between network delays from the mixer to the first and second device is denoted reception delay difference (Drx).

A difference between network delays from the first and second devices to the mixer is denoted transmitted delay difference (Drx).

FIG. 1A illustrates first Rx delay 91, second Rx delay 92, first Tx delay 93, and second Tx delay 94.

FIG. 1A further illustrates first room 81 in which first and second persons, first and second device and mixer are located as well as second room 82 in which third person and third device are located.

The mixer may be located elsewhere, and may be replaced by one or more networks.

Figure 1B:
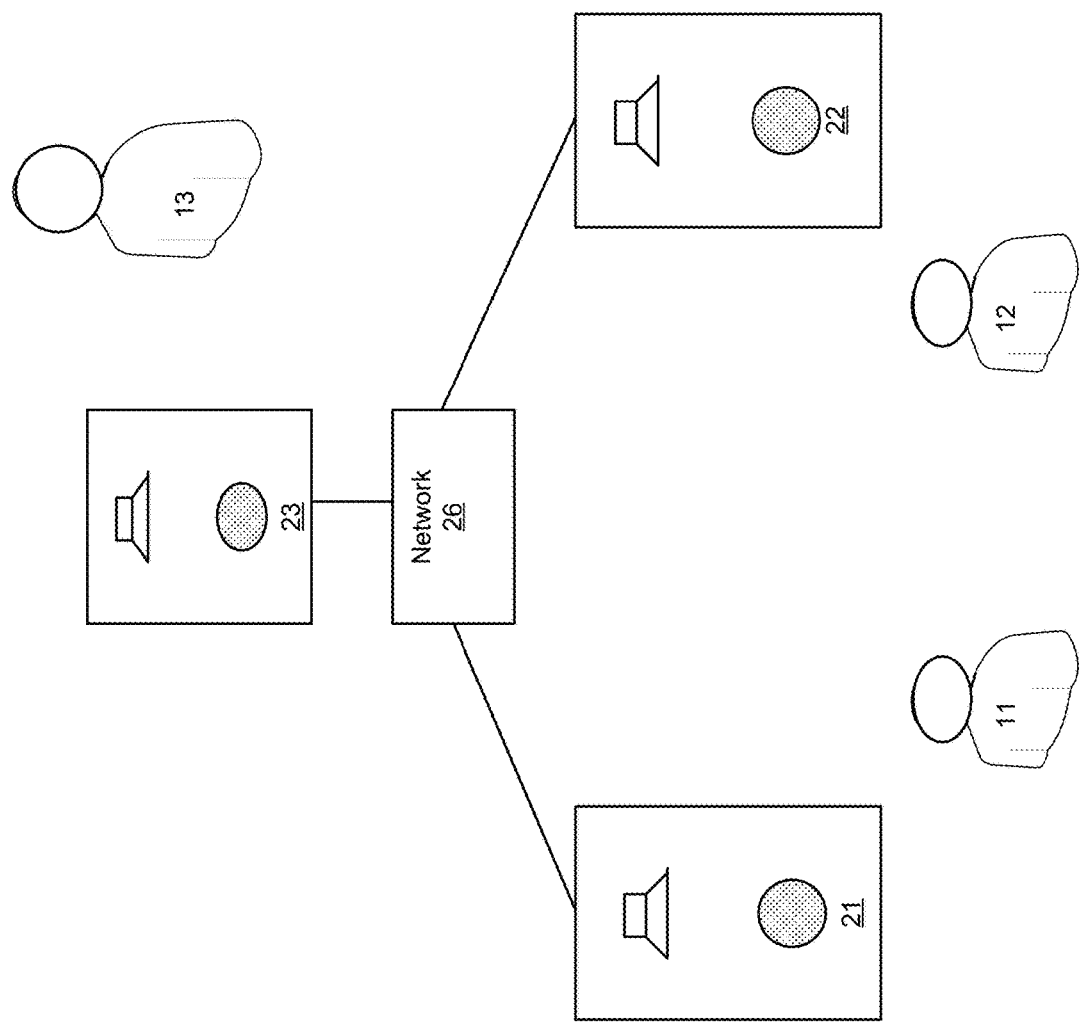
FIG. 1B illustrates three persons that participate in a conference call, a network and three devices according to an embodiment of the invention.

FIG. 1B illustrates three persons 11, 12 and 13 that participate in a conference call, a network 26 and three devices according to an embodiment of the invention. Network of FIG. 1B replaces mixer 25 and has mixing capabilities for combining the signals from first and second devices.

Figure 1C:
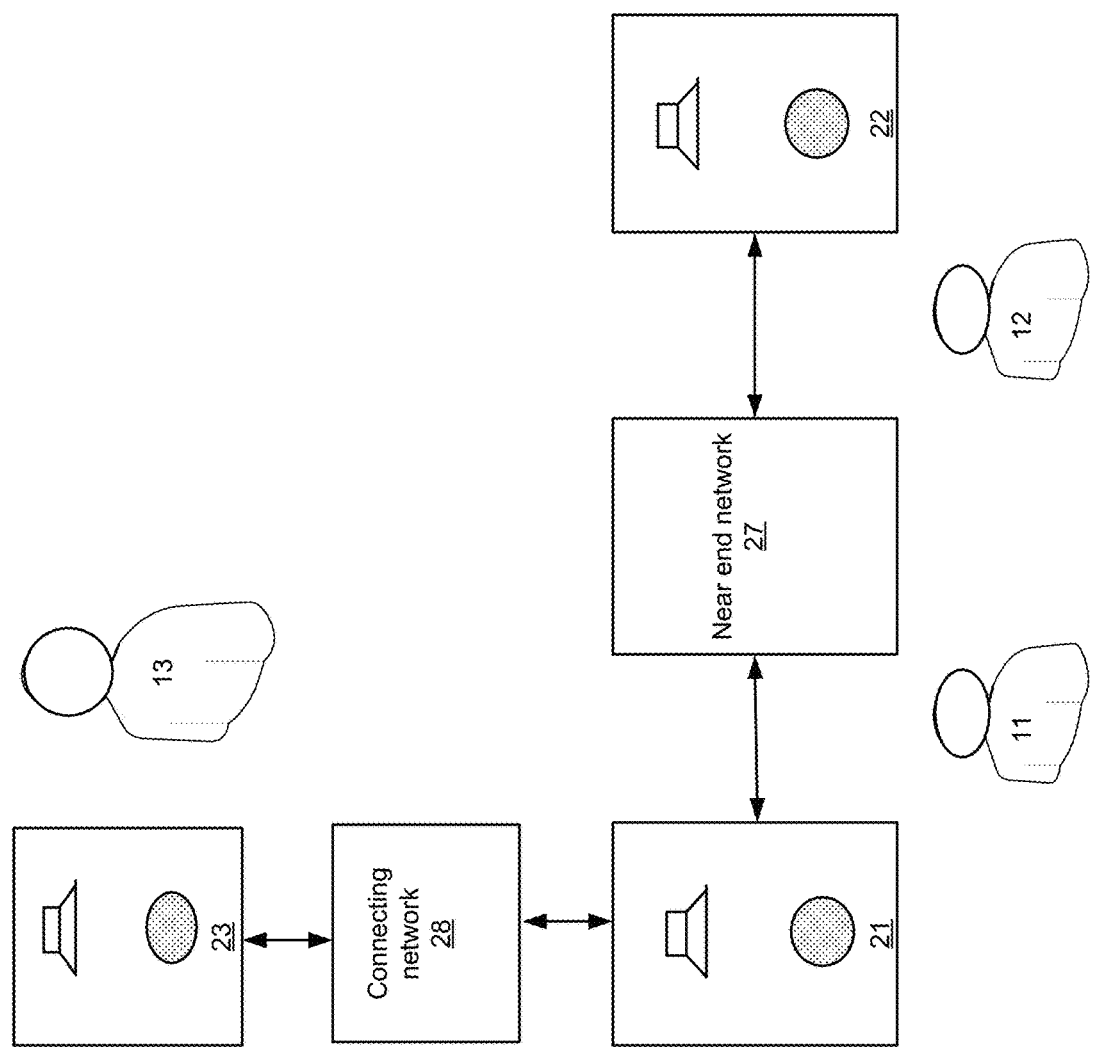
FIG. 1C illustrates three persons that participate in a conference call, a connecting network, a near-end network and three devices according to an embodiment of the invention.

FIG. 1C illustrates three persons 11, 12 and 13 that participate in a conference call, a connecting network 28, a near-end network 27 and three devices 21, 22 and 23 according to an embodiment of the invention.

In FIG. 1C the connecting network 28 (may be a long-range network such as the Internet or any long-range network) communicates with the first device and may not communicate with the second device. The near-end network 27 may relay signals (for example digital signals) between first and second devices.

Near-end network may be a short-range network such as but not limited to Bluetooth, BLE, WI-FI, PROSE Relay from PSLTE, voice over IP etc.

Figure 2A:
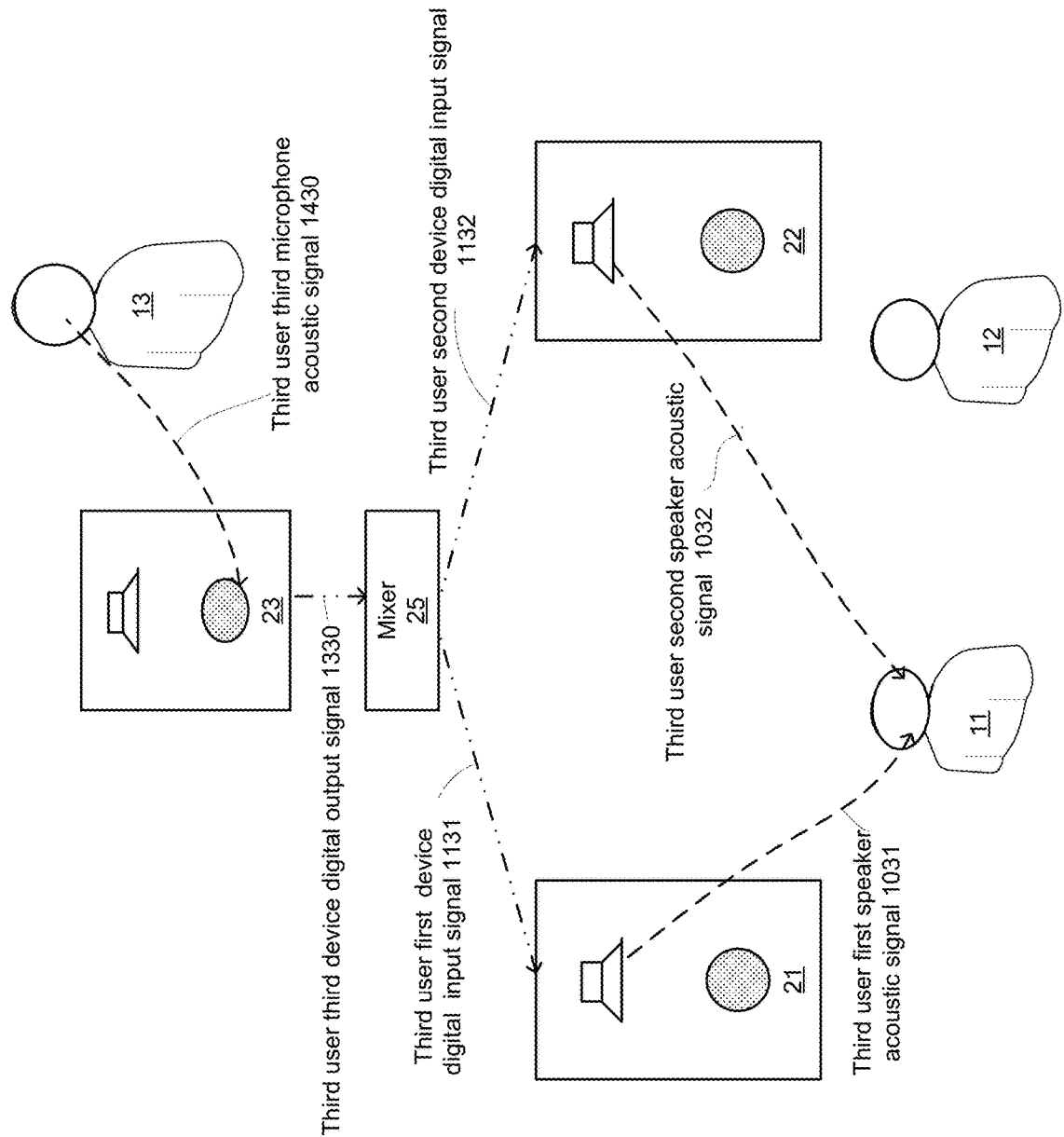
FIG. 2A illustrates a third person that talks during conference call, a mixer, three devices and various signals generated during the conference call according to an embodiment of the invention.

FIG. 2A illustrates a third person 13 that talks during conference call, a mixer 25, three devices 21, 22 and 23 and various signals (1430, 1330, 1131, 1132, 1031 and 1032) generated during the conference call according to an embodiment of the invention.

As indicated above there may be a delay difference of Drx between signal 1131 and signal 1132. Unless compensated, signal 1031 and signal 1032 may suffer from a delay difference of Drx.

The perceived speech quality and intelligibility decreases due to Drx.

Drx should be estimated and compensated in each near-end device or at least in one of the first and second devices Drx may be estimated in various manners. For example—Drx may be estimated by cross correlation between signals 1031 and 1032 which are received by the microphones of both devices as echo. Additionally or alternatively, the correlation between signals 1031 and 1131 in the first device can be used to estimate the delay.

In circuit switched networks, this delay can be constant. In packet switched network (e.g. VOIP, VOLTE) the delay can be time variant and estimated continuously Estimation module can get info from jitter buffer module that manages dynamic delays to avoid packet losses.

The jitter buffer mentioned above may be in the communication processor, in the Rx path, as an interface to the network. It is used to synchronized the order of received packets from the networks. The jitter buffer may be used to apply dynamic buffering to get rid of network delay variations.

Each one of the mentioned above or below AEC modules may operate on the digitally sampled audio signals of the communication device. The transfer function of the acoustic environment from the loudspeaker to the microphone on the device is estimated to cancel the received echoes from the microphone signal. The AEC may be or may include an adaptive filter. An adaptive filter is used in voice echo cancellation to accommodate the time varying nature of the echo path. The filter learns the path when the far-end speaker is talking and the near-end speaker is silent and adjusts its coefficients (transfer function) according to the algorithm optimization criterion.

Any AFC module may apply Non-Linear Processing. Non-linear processing is the removal of residual echo left by the adaptive filter (echo cancellation). Residual echoes are the un-modeled components of the echo path. Most adaptive filters are linear and can only cancel the linear portions of the echo path. Thus the nonlinear portions cannot be removed via the adaptive filter and a residual echo suppressor follows the filter to handle nonlinear portions of the echo that remain.

Figure 2B:
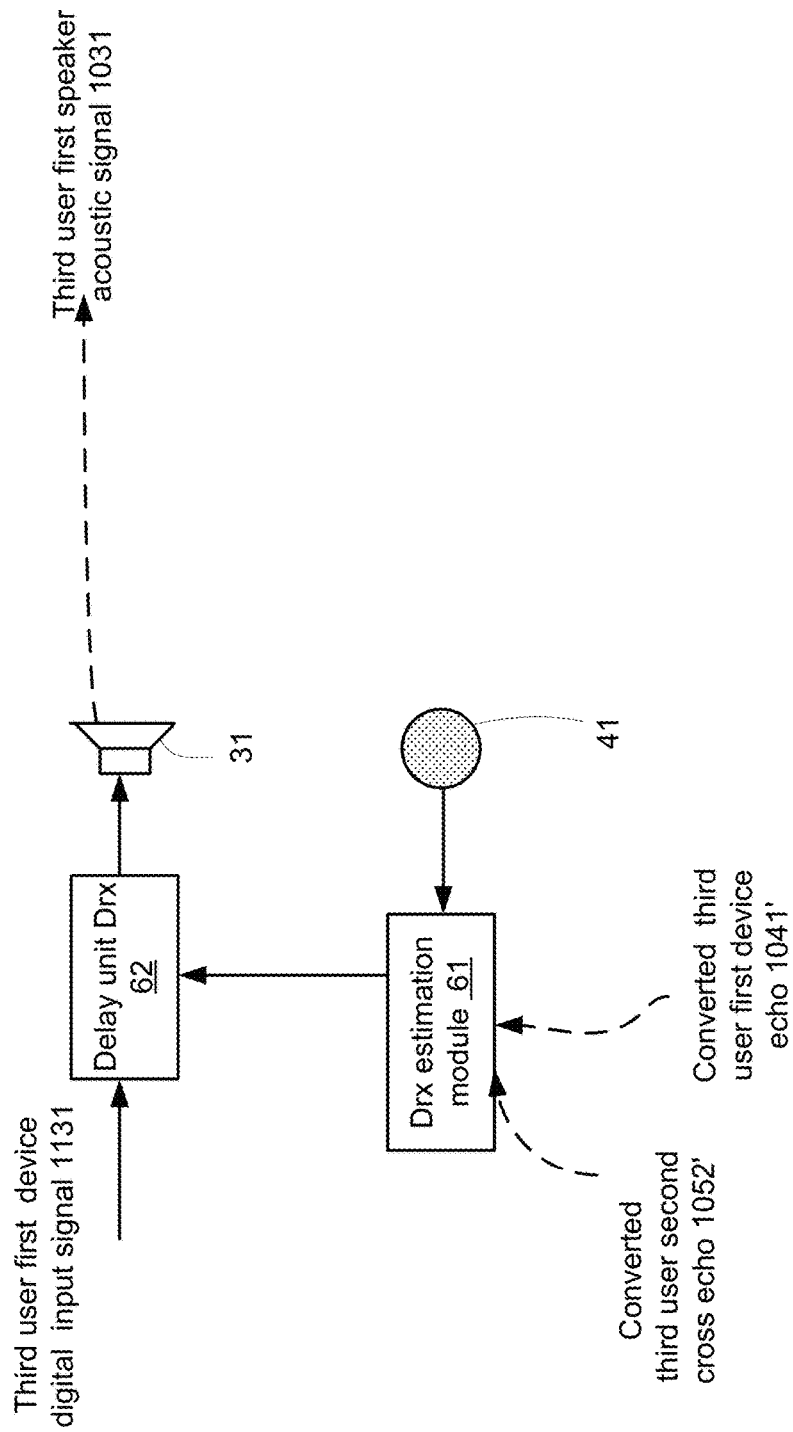
FIG. 2B illustrates various components and one or more compensation modules for performing compensation operations related to some of the signals of FIG. 2A according to an embodiment of the invention.

FIG. 2B illustrates various components (such as first microphone 41 and first speaker 31) and one or more compensation modules (such as delay unit Drx 62 and Drx estimation module 61) for performing compensation operations related to signals of FIG. 2A according to an embodiment of the invention.

Figure 4A:
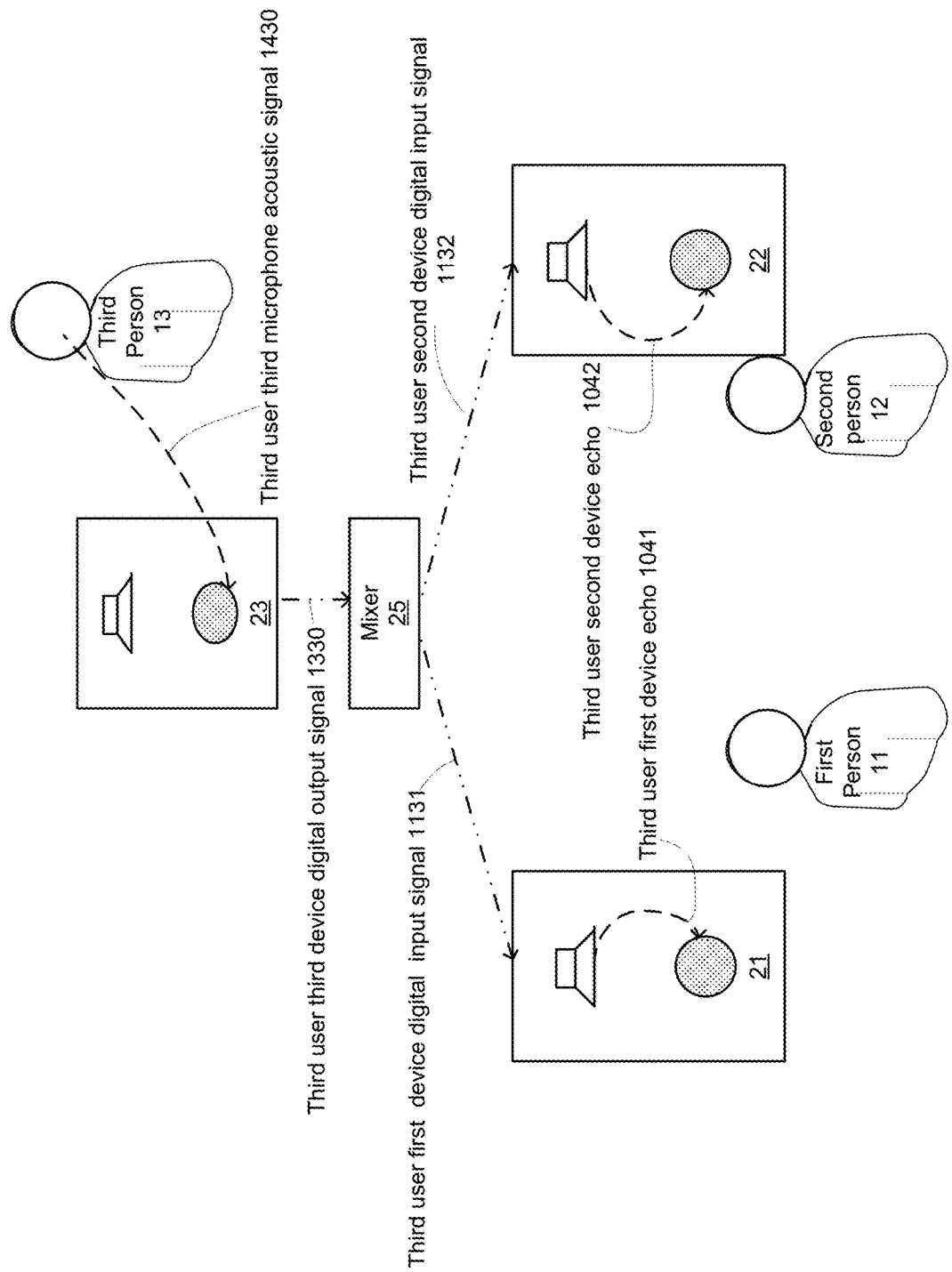
FIG. 4A illustrates a third person that talks during conference call, a mixer, three devices and various signals generated during the conference call according to an embodiment of the invention.
Figure 4B:
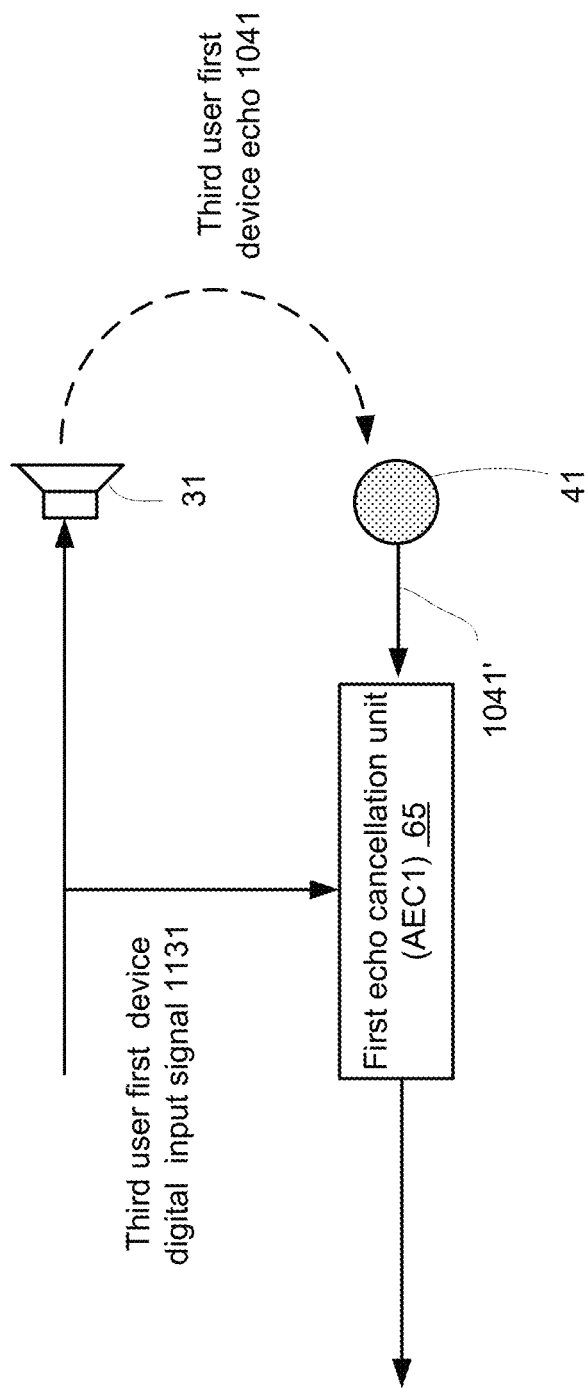
FIG. 4B illustrates various components and one or more compensation modules for performing compensation operations related to some of the signals of FIG. 4A according to an embodiment of the invention.

Drx estimation module 61 may estimate Drx using, for example correlation between the converted third user second cross echo 1052' and the converted third user first device echo (denoted 1041' in FIG. 4B).

Additionally or alternatively, the correlation between signals 1031 and 1131 in the first device can be used to estimate the delay.

Delay unit Drx 62 may delay the converted third user first device echo 1041' before it is fed to first speaker in order to generate the third user first speaker acoustic signal 1031 that is Drx compensated.

The Drx compensation may be performed by the first device, by the second device or by both first and second devices.

Figure 3A:
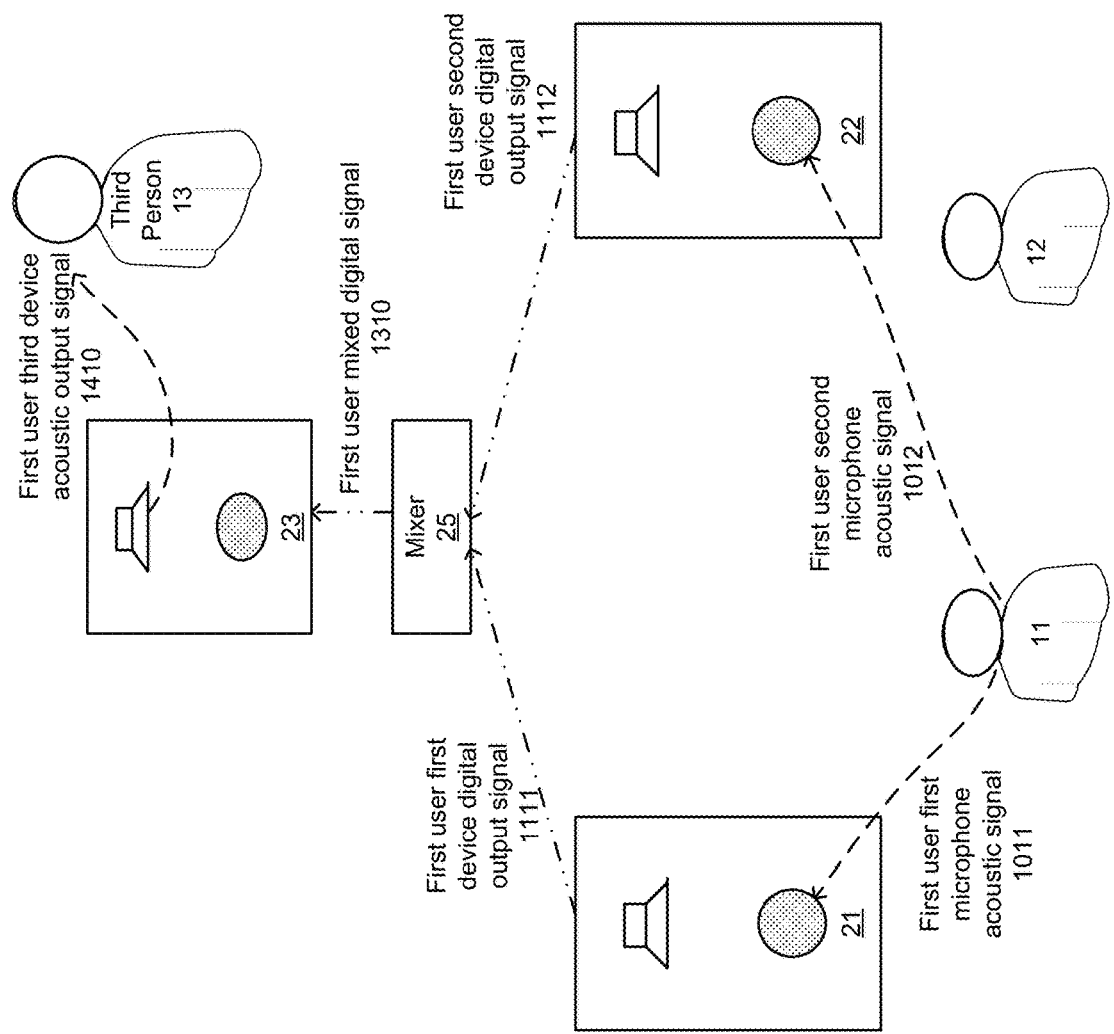
FIG. 3A illustrates a first person that talks during conference call, a mixer, three devices and various signals generated during the conference call according to an embodiment of the invention.

FIG. 3A illustrates a first person that talks during conference call, a mixer, three devices and various signals (1011, 1012, 1111, 1112, 1310 and 1410) generated during the conference call according to an embodiment of the invention.

There may be a delay difference of Dtx between signals 1111 and 1112. Without Dtx compensation the mixer 25 may mix time shifted signals and the third person will eventually receive a mixture of time shifted signals. The perceived speech quality and intelligibility decreases due to Dtx.

Dtx should be estimated and compensated in at least one of the first and second devices.

The first and second device may not be aware of Dtx but may estimate Dtx based on Drx.

The third device may can apply de-reverberation techniques to solve the problem.

The third device may estimate Dtx by analyzing signal 1310 and may send feedback to the first and second devices.

Figure 3B:
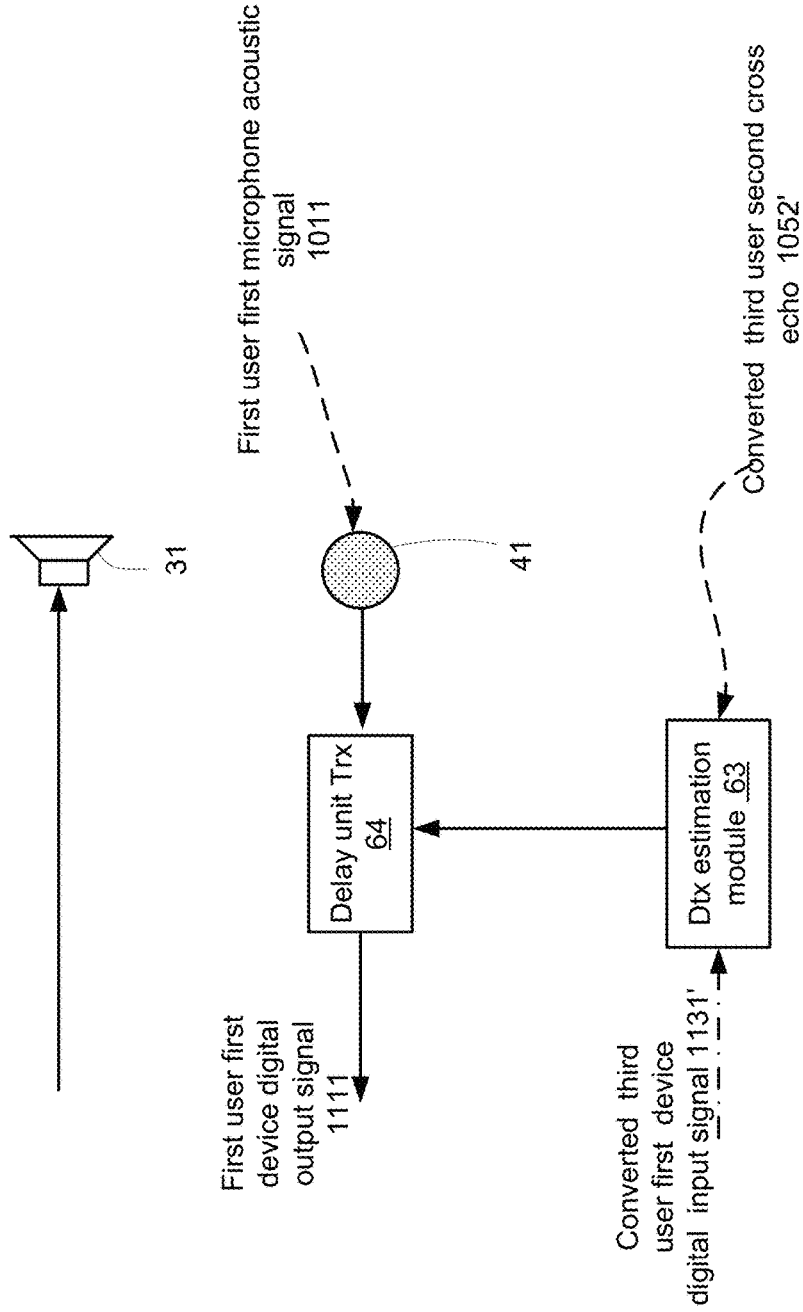
FIG. 3B illustrates various components and one or more compensation modules for performing compensation operations related to some of the signals of FIG. 3A according to an embodiment of the invention.

FIG. 3B illustrates various components (such as first microphone 41 and first speaker 31) and one or more compensation modules (such as delay unit Dtx 64 and Dtx estimation module 63) for performing compensation operations related to signals of FIG. 3A according to an embodiment of the invention.

Dtx estimation module 63 may estimate Trx using, for example correlation between the following signals—the converted third user second cross echo 1052' and the converted third user first digital input signal 1131'.

Delay unit Trx 64 may delay a converted first user first microphone acoustic signal (converted by microphone from first user first microphone acoustic signal 1011) before it is fed to mixer in order to generate a first user first device digital signal that is Trx compensated.

The Trx compensation may be performed by the first device, by the second device or by both first and second devices.

FIG. 4A illustrates a third person 13 that talks during conference call, a mixer 25, three devices 21, 22 and 23 and various signals (1430, 1330, 1131, 1132, 1041 and 1042) generated during the conference call according to an embodiment of the invention.

In a hand-free mode there may be an echo due to the acoustic coupling between the microphone and the speaker of each device.

FIG. 4B illustrates various components (such as first microphone 41 and first speaker 31) and one or more compensation modules (first echo cancellation unit (AEC1) 65) for performing compensation operations related to some of the signals of FIG. 4A according to an embodiment of the invention.

AEC1 65 may apply one or more linear and/or non-linear echo cancellation processes. Additionally or alternatively, AEC1 may apply linear and/or non-linear echo suppression processes. Non-linear echo components may result from non-linearity of the speaker transfer function and/or from vibrations of the device.

The third user first device echo 1041 is received by first microphone and is converted to the converted third user first device echo 1041'. The third user first device echo 1041 is generated by first speaker 31 in response to third user first device digital input signal 1131. AEC1 performs echo cancellation after being fed by third user first device digital input signal 1131 and converted third user first device echo 1041'. The output of AEC1 65 is sent from first I/O port 51 to mixer 25.

Figure 5A:
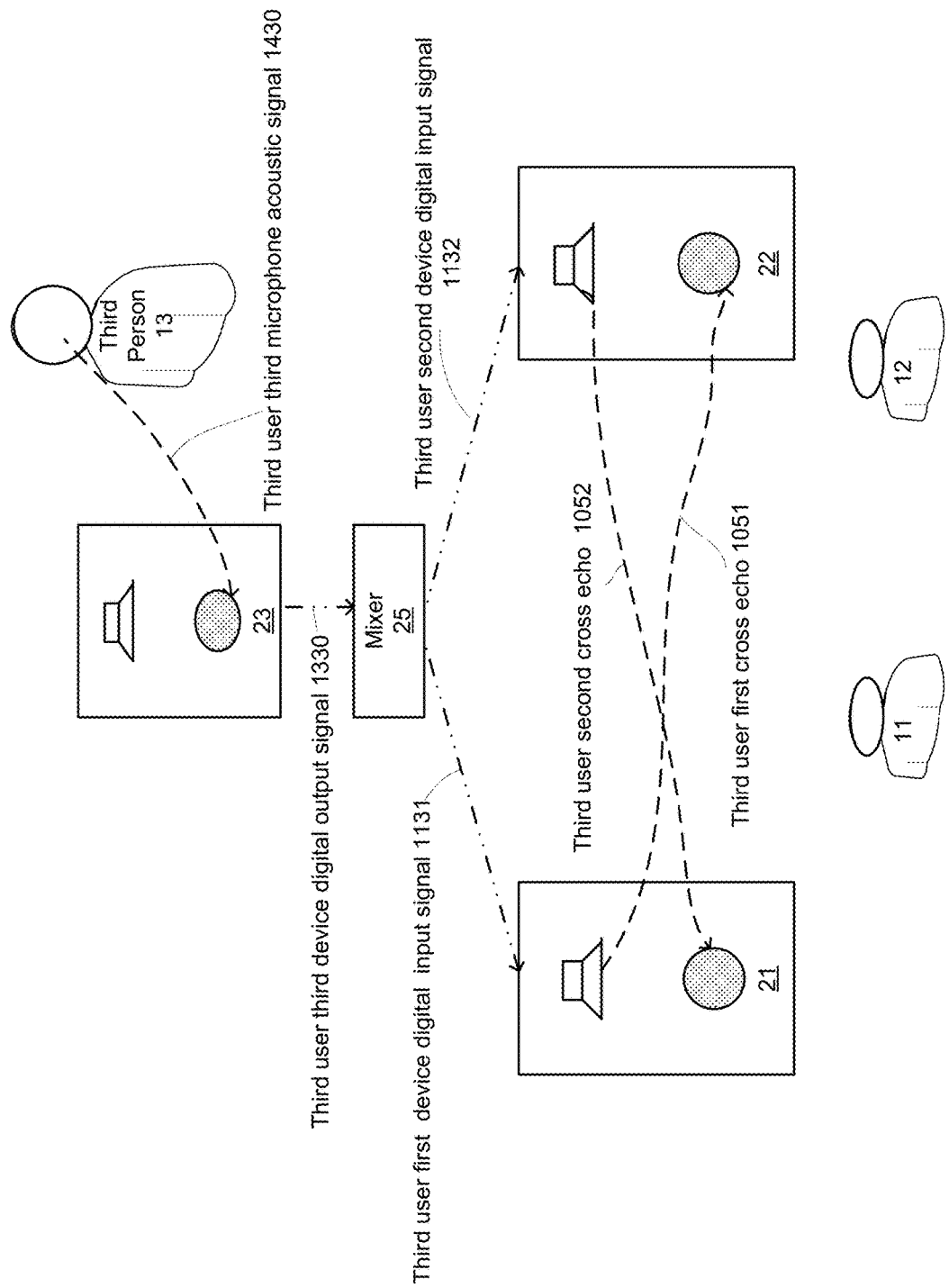
FIG. 5A illustrates a third person that talks during conference call, a mixer, three devices and various signals generated during the conference call according to an embodiment of the invention.

FIG. 5A illustrates a third person 13 that talks during conference call, a mixer 25, three devices 21, 22 and 23 and various signals (1430, 1330, 1132, 1131, 1051 and 1052) generated during the conference call according to an embodiment of the invention.

A cross acoustic echo problem exists due to acoustic coupling between the speaker or one device and a microphone of another device. This is especially true when the first and second devices are expected to be at the same room and relatively proximate to each other (for example—less than 10 meters)—as the first and second persons need to use these devices during the conference call and may also need to hear each other without the aid of these devices.

The cross echo may be cancelled using at least one linear and/or non-linear echo cancel processes and at least one linear and/or non-linear echo suppression processes.

In addition, Drx should be compensated in the Rx path.

The non-linear cross echo is due to speaker non-linearity and non-linear differences due transmission links (between the first and second devices, the mixer and the third device) that may include vocoders and time-variant network delays.

Direct echo cancellation ($AEC_1$) and cross echo cancellation (AEC2) can be done jointly using the same module when the delay is compensated correctly.

For example, assuming signal 1131 and signal 1132 are the same but with delay difference because of different network delays. First microphone 21 gets both the echo of signal 1131 and an echo of signal 1132. Since signal 1131 and signal 1132 are the same with different delays, we can use a joint AEC to cancel jointly the different couplings using signal 1131 as reference to AEC.

Figure 5B:
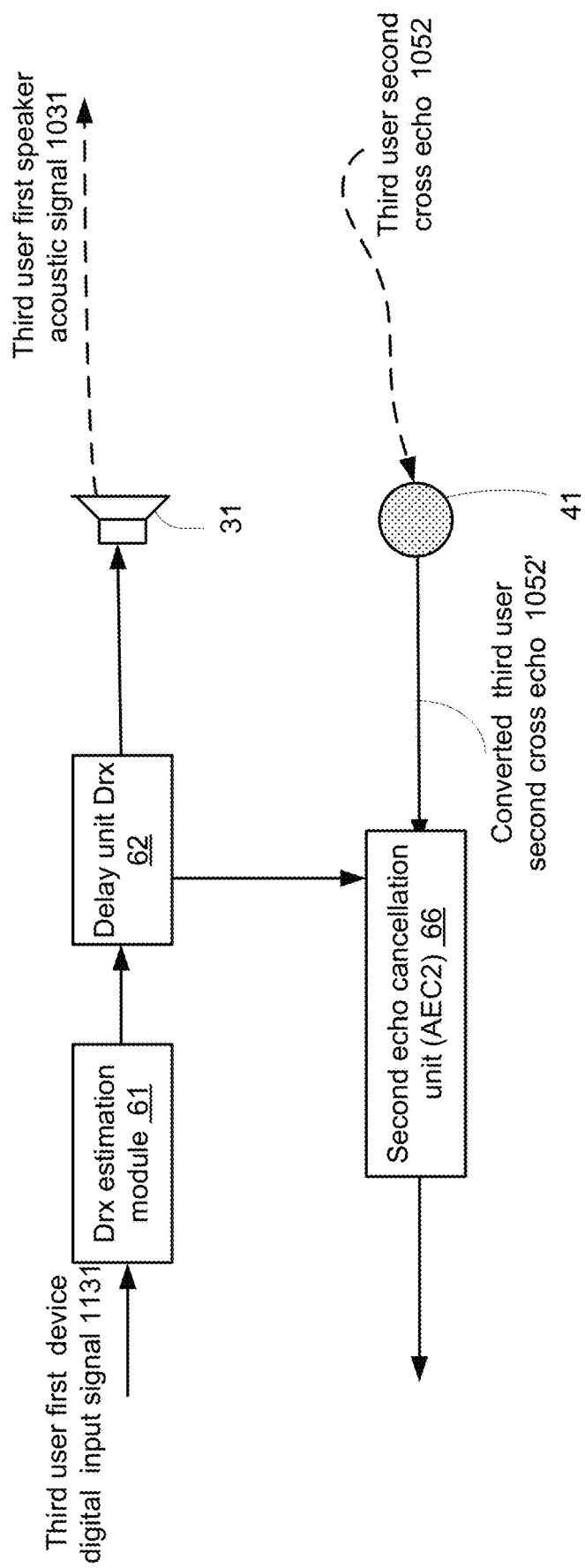
FIG. 5B illustrates various components and one or more compensation modules for performing compensation operations related to some of the signals of FIG. 5A according to an embodiment of the invention.

FIG. 5B illustrates various components (such as first microphone 41 and first speaker 31) and one or more compensation modules (such as second echo cancellation unit (AEC2) 66, delay unit Drx 62 and Drx estimation module 61) for performing compensation operations related to some of the signals of FIG. 5A according to an embodiment of the invention.

The first microphone 41 may sense third user second cross echo 1052 and output the converted third user second cross echo 1052'. The converted third user second cross echo 1052' may be fed to AEC 2.

Figure 6A:
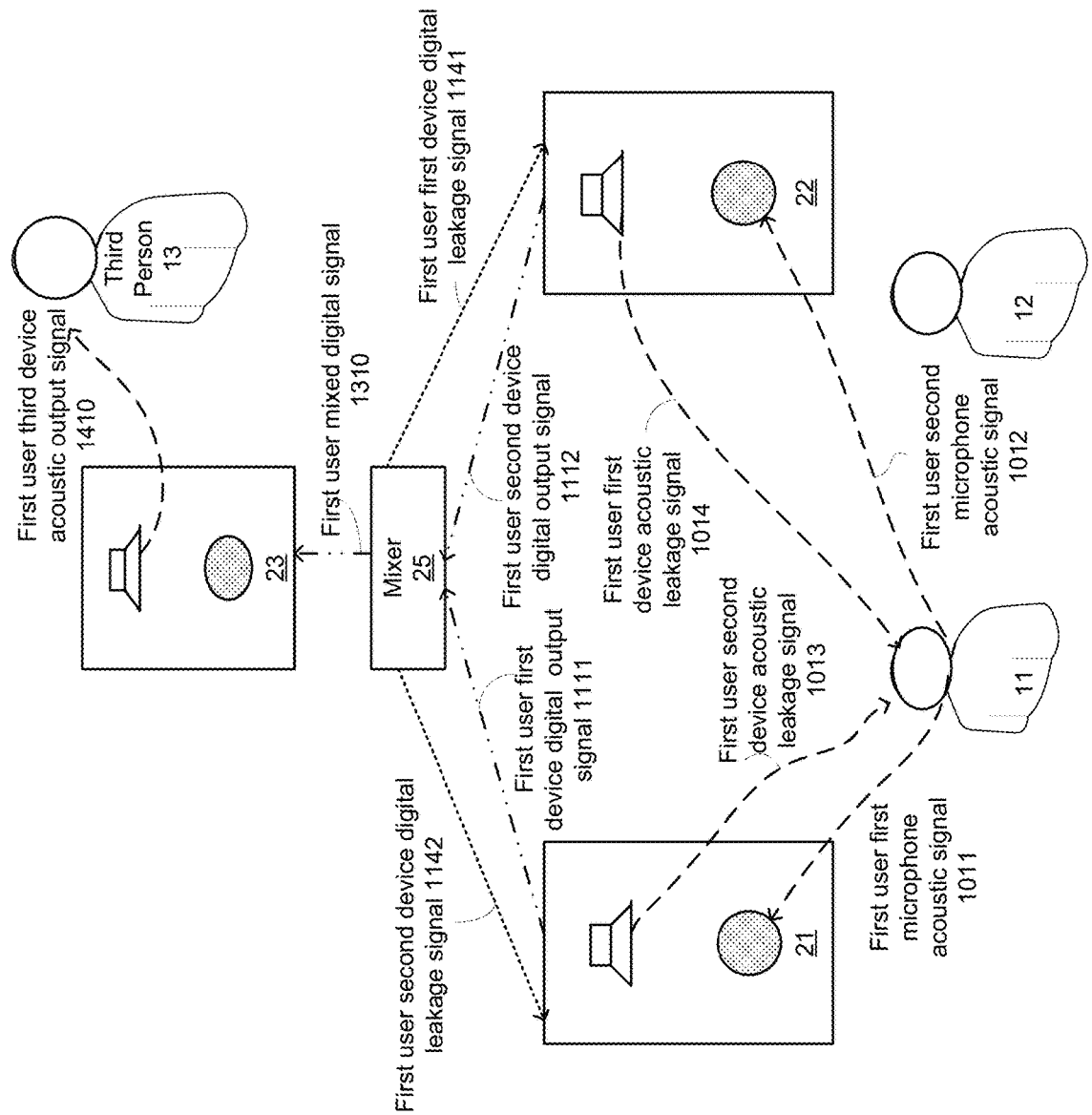
FIG. 6A illustrates a first person that talks during conference call, a mixer, three devices and various signals generated during the conference call according to an embodiment of the invention.

FIG. 6A illustrates a first person that talks during conference call, a mixer, three devices and various signals generated during the conference call according to an embodiment of the invention.

When the first person (or the second person) talks his speech (acoustic signal) is captured by first and second microphones of first and second devices (signals 1011 and 1012), causes signals 1111 and 1112 to be outputted from first and second devices to be sent to mixer and causes signals 1141 and 1142 to reach second and first devices respectively. These signals cause first and second speakers to output signals 1013 and 1014.

The first and second persons perceives the acoustic leakage signals as unwanted delayed echo and can make the participation in the conference call impossible or non-tolerable.

The acoustic leakage signals may be cancelled by AEC3 using at least one linear and/or non-linear echo cancel processes and at least one linear and/or non-linear echo suppression processes.

AEC3 is the same module with AEC1. (Use of AEC3 is the most innovative part of the patent)

AEC3 may perform the echo cancellation and/or suppression using the correlation between the original speech (signals 1011 and 1012) and the output acoustic leakage signals 1013 and 1014.

AEC3 can be implemented a correlator as feedback detector and attenuator whenever feedback exists.

AEC3 may benefit from receiving an estimate of Dn. Dn may be estimated using cross correlation or any other method and need to be compensated.

Figure 6B:
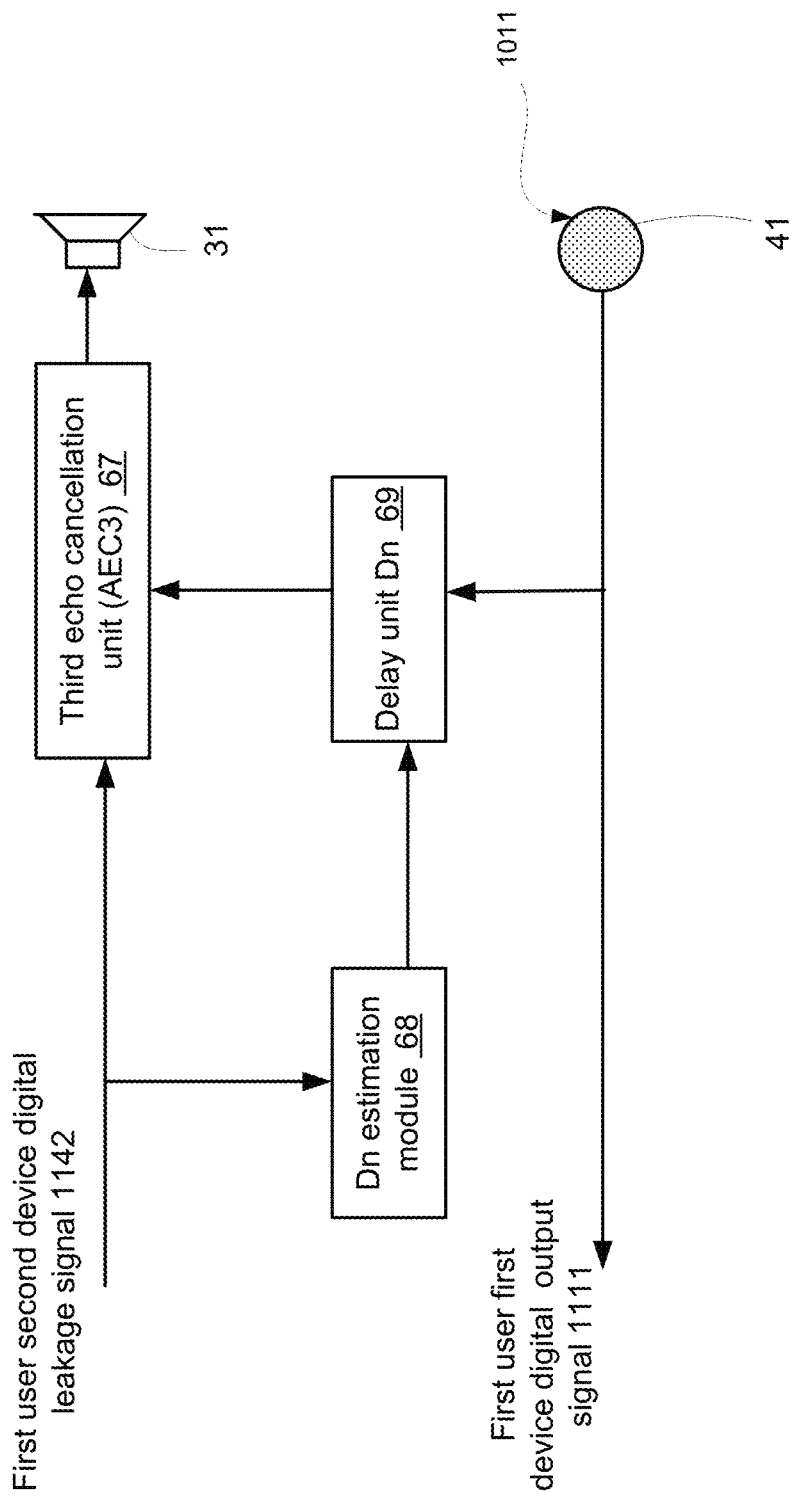
FIG. 6B illustrates various components and one or more compensation modules for performing compensation operations related to some of the signals of FIG. 6A according to an embodiment of the invention.

Dn is the time for the transmission of signals 1012, 1112 and 1142 using the fact that signal 1011 equals signal 1012. It is estimated by correlating converted versions of signals 1011 and 1142, FIG. 6B illustrates various components (such as first microphone 41 and first speaker 31) and one or more compensation modules (Third echo cancellation unit (AEC3) 67, Delay unit Dn 69 and Dn estimation module 68) for performing compensation operations related to some of the signals of FIG. 6A according to an embodiment of the invention.

The output of first microphone 41 is fed to delay unit Dn that sends a delayed signal (delayed by Dn) to AEC3 67. AEC3 also receives signal 1111 and perform echo cancellation and/or echo suppression to provide an output signal to speaker.

Dn estimation module 68 may estimate Dn by correlating signals 1111 and 1142.

AEC2 may be the same as AEC1 and the same as AEC3. Regarding AEC3-AEC3 manipulates the input signal to the speaker and can even mute the speaker, because the first and second users may hear each other without the assistance of their devices and thus can improve the echo cancellation in a substantial manner.

Figure 7A:
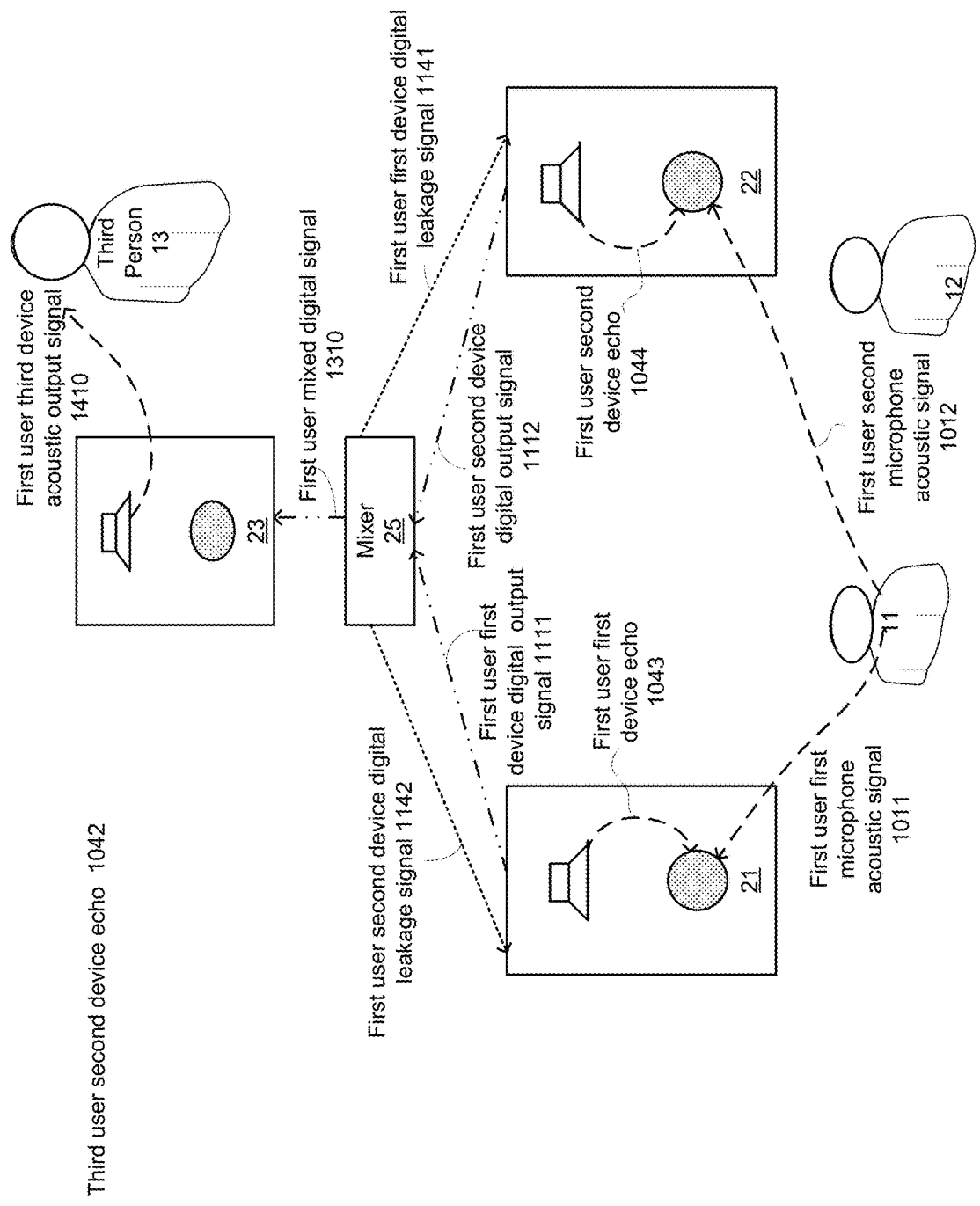
FIG. 7A illustrates a first person that talks during conference call, a mixer, three devices and various signals generated during the conference call according to an embodiment of the invention.

FIG. 7A illustrates a first person that talks during conference call, a mixer, three devices and various signals (1011, 1012, 1111, 1112, 1141, 1141, 1310 and 1410) that are generated during the conference call according to an embodiment of the invention.

When first person talks and if the feedback is not cancelled with AEC3 or there exists some residual feedback, an echo (such as signals 1043 and 1044) from a speaker is received by the microphone of the same device. The content of the residual feedback depends on whether there is an AEC3 or not and if there—on the output of AEC3.

The echo may be cancelled and/or suppressed by first echo cancellation unit (AEC1) 65 that may apply one or more linear and/or non-linear echo cancellation processes. Additionally or alternatively, AEC1 may apply linear and/or non-linear echo suppression processes.

It should be noted that successful implementation of AEC3 may avoid the generation of the acoustic leakage signals.

Figure 7B:
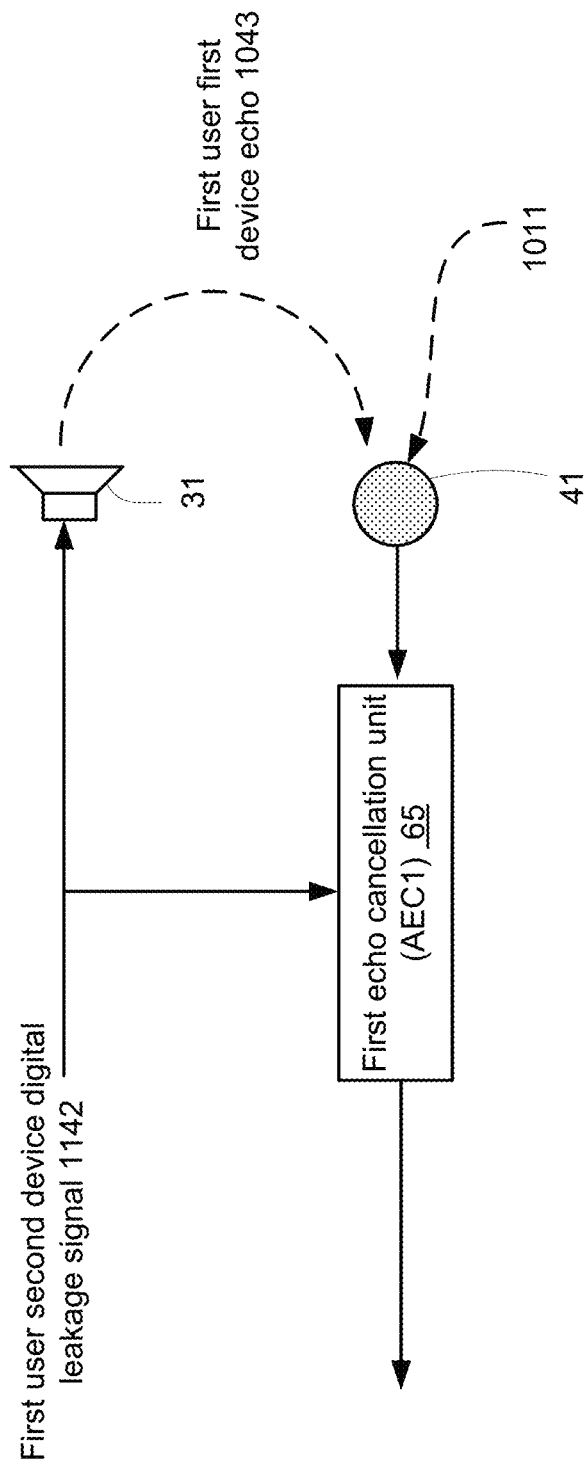
FIG. 7B illustrates various components and one or more compensation modules for performing compensation operations related to some of the signals of FIG. 7A according to an embodiment of the invention.

FIG. 7B illustrates various components (such as first microphone 41 and first speaker 31) and one or more compensation modules for performing compensation operations related to some of the signals of FIG. 7A according to an embodiment of the invention.

The first user first device echo 1043 is received by first microphone and is converted to a converted first user first device echo that is fed to AEC1 65. AEC1 also receives first user second device digital leakage signal 1142.

When the first person talks, signals 1031 and 1032 are received by the microphones of the first and second devices.

Digital leakage signals 1141 and 1142 may be used by the AEC1 of the first and second devices as echo references.

If the digital leakage signals 1141 and 1142 are not cancelled with any AEC3 then the desired signal (signals 1011 and 1012) may be suppressed by the AEC1 of the first and second devices due to the existence of non-zero value echo references-which are the digital leakage signals.

In AEC1, output of AEC3 which gets 1142 as input is used as reference signal. So when AEC 3 does not cancel the signal completely, AEC1 will try to cancel the echo of the output of AEC3. On the other hand, the first person is still talking and generating signal 1011 as input to AEC1.

This generates a double talk situation which always exists when the first person is talking where AEC1 will do echo suppression and suppress the desired signal of the first person.

AEC1 should apply a double talk detection which can also detect feedback situation in order not to clip the desired speech of the first person, This unwanted suppression of signals 1011 and 1012 may result in a reception, by the third person, of clipped and not intelligible speech signal 1410.

While using AEC3 the feedback will be cancelled and feedback-free signal will be used as reference to avoid clipping of the speech of the first person.

AEC1 may include additional control mechanism to avoid this clipping

Figure 7C:
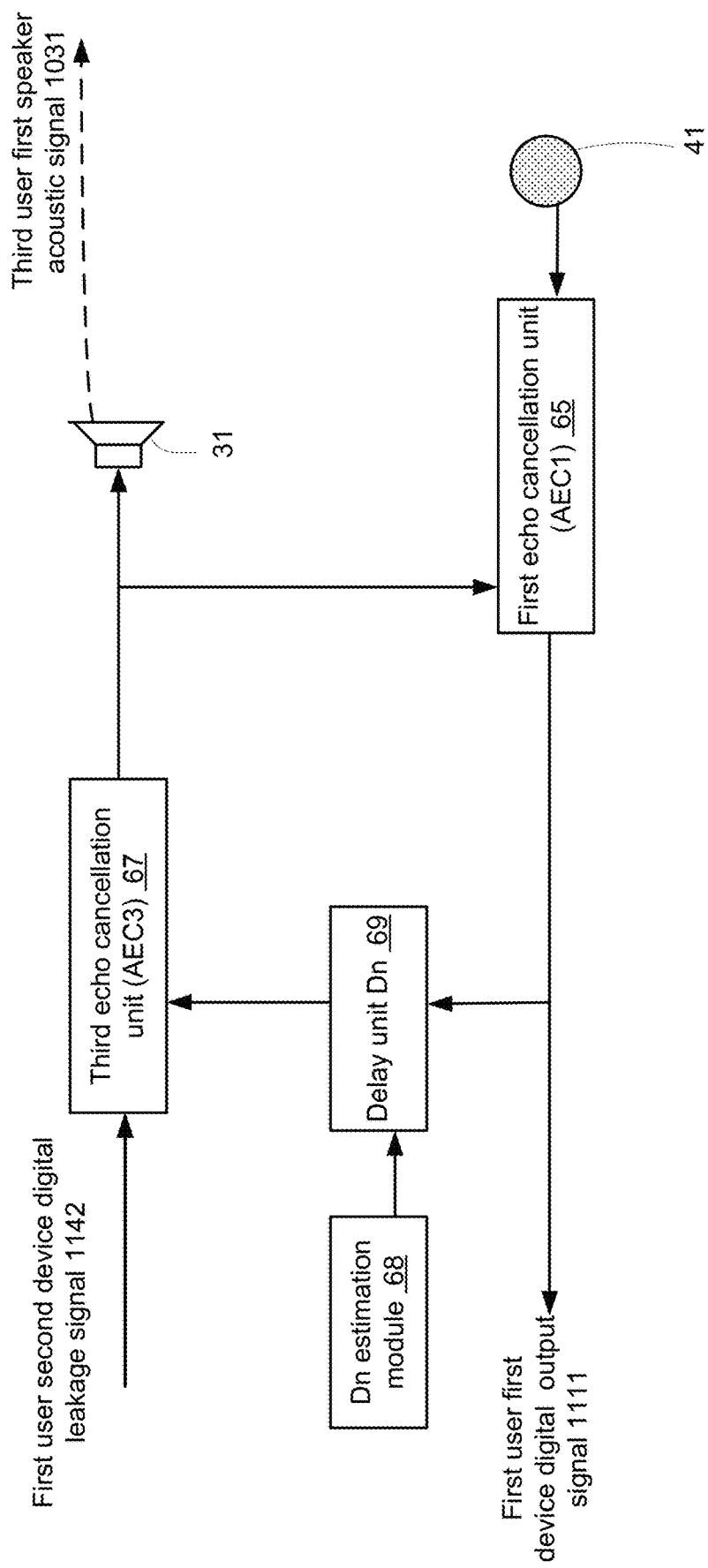
FIG. 7C illustrates various components and one or more compensation modules for performing compensation operations related to some of the signals of FIG. 7A according to an embodiment of the invention.

FIG. 7C illustrates various components (such as first microphone 41 and first speaker 31) and one or more compensation modules for performing compensation operations related to some of the signals of FIG. 7A according to an embodiment of the invention.nm, The output of first microphone 41 is fed to AEC1 65. AEC1 65 is also fed with the output of AEC3 67. AEC1 65 outputs first user first device digital device output signal 1111.

AEC3 67 receives the first user second device digital leakage signal 1142 and receives (from delay unit Dn 69) a Dn-delayed first user first device digital device output signal 1111.

Delay unit Dn receives the estimate of Dn from Dn estimation module 68.

Figure 8A:
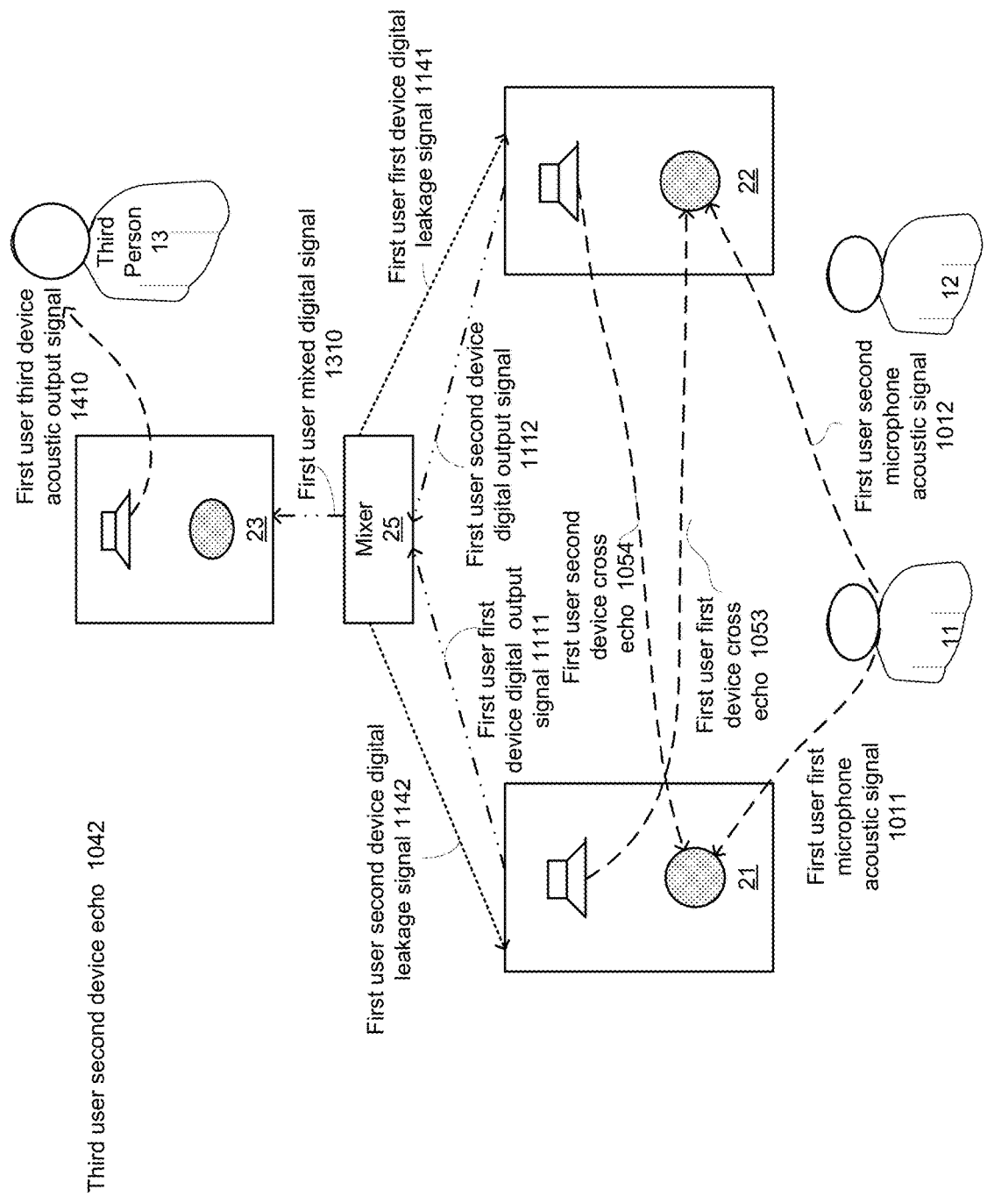
FIG. 8A illustrates a first person that talks during conference call, a mixer, three devices and various signals generated during the conference call according to an embodiment of the invention.

FIG. 8A illustrates a first person that talks during conference call, a mixer, three devices and various signals (1011, 1012, 1053, 1054, 1111, 1112, 1141, 1142, 1310 and 1410)

that are generated during the conference call according to an embodiment of the invention.

When the first person talks and if the feedback is not cancelled with AEC3 of the other device or there exists still some residual feedback, it is played to the speaker of one of the first and second devices and is received as a cross echo of a microphone of another device out of the first and second device. A first feedback path includes first microphone, first device to mixer, mixer to second device and second speaker—see various signals (1011, 1111, 1141 and 1054) that propagate over the first feedback path. A second feedback path includes second microphone, second device to mixer, mixer to first device and first speaker—see various signals (1012, 1112, 1141 and 1053) that propagate over the second feedback path.

There feedback paths result in a howling effect.

A cross echo (out of signal 1053 and 1054) may exist if the AEC3 of the device that outputted that cross echo did not exist or did not cancel the feedback completely.

Successful implementation of AEC3 in each of the first and second devices may avoid the generation of the cross echoes and thus avoid feedback and howling.

The howling may be cancelled by using linear and/or non-linear acoustic feedback canceller.

One or more feedback paths convey signals 1011, 1111, 1141 and 1054.

Feedback cancellation is done based on signals 1011 and 1054. Signal 1054 is a delayed version of signal 1011.

Additionally or alternatively, the echo cancelling may be executed on 1111 (that results from signal 1011) and delayed version of signal 1111 (that results from signal 1054).

Non-linear feedback is due to speaker non-linearity, vocoder and time-variant delay The network delay need to be estimated using cross correlation or any other method.

An alternative method is a special linear and non-linear echo cancellation (AEC4) since the digital leakage signals 1142 and 1141 are correlated to the cross echoes 1053 and 1054.

Figure 8B:
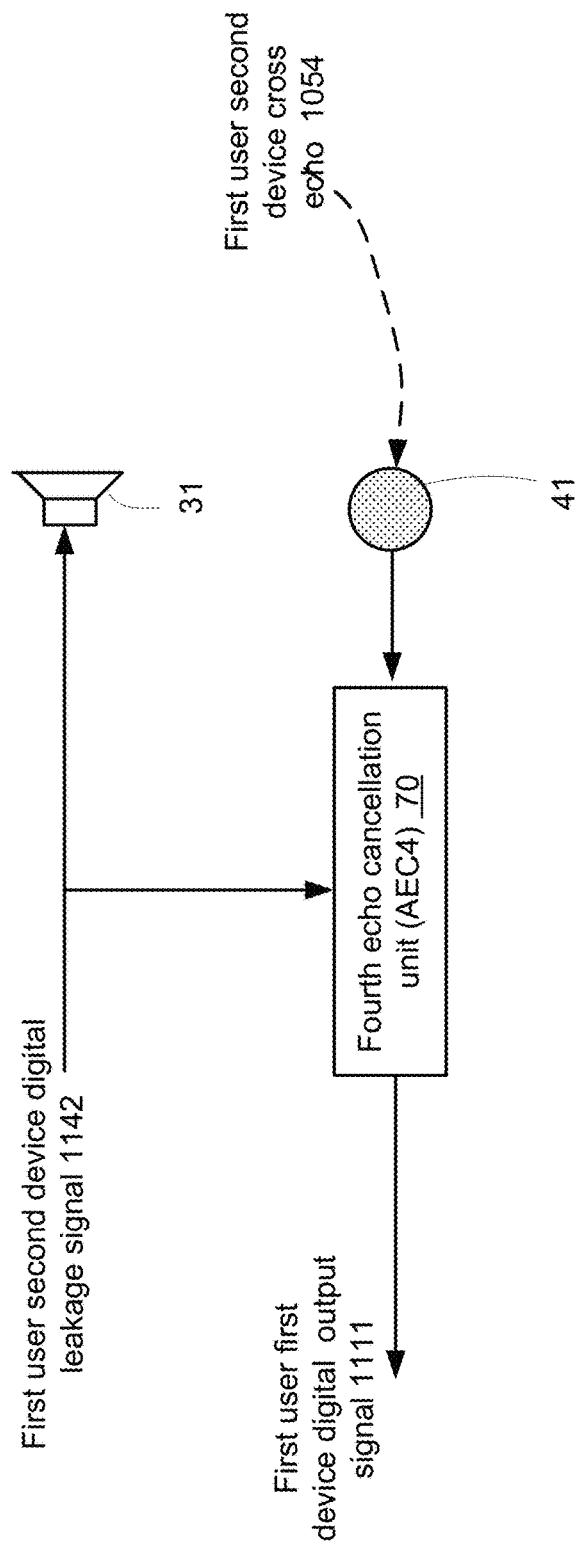
FIG. 8B illustrates various components and one or more compensation modules for performing compensation operations related to some of the signals of FIG. 8A according to an embodiment of the invention.

FIG. 8B illustrates various components (such as first microphone 41 and first speaker 31) and one or more compensation modules (such as fourth echo cancellation unit (AEC4 70)) for performing compensation operations related to some of the signals of FIG. 8A according to an embodiment of the invention.

AEC4 70 is fed by the converted signal from first microphone (a converted first used second device cross echo) and by a first user second device digital leakage signal 1142 and perform echo cancellation and/or echo suppression to output first user first device digital output signal 1111.

Figure 8C:
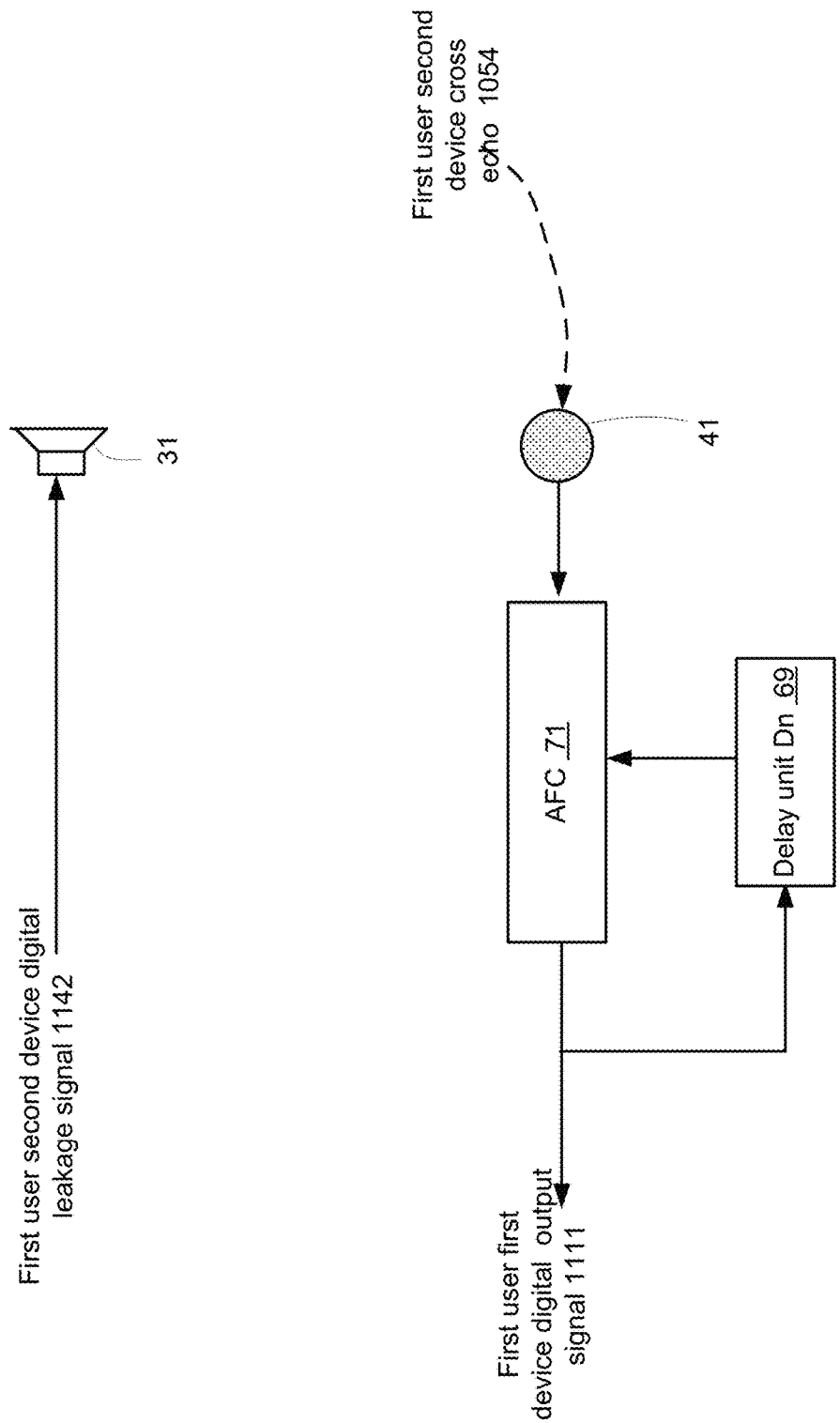
FIG. 8C illustrates various components and one or more compensation modules for performing compensation operations related to some of the signals of FIG. 8A according to an embodiment of the invention.

FIG. 8C illustrates various components (such as first microphone 41 and first speaker 31) and one or more compensation modules (AFC 71, delay unit Dn 69) for performing compensation operations related to some of the signals of FIG. 8A according to an embodiment of the invention.

AFC 71 is fed by the converted signal from first microphone (a converted first used second device cross echo) and by delayed (by Dn) first user first device digital output signal 1111.

Figure 9A:
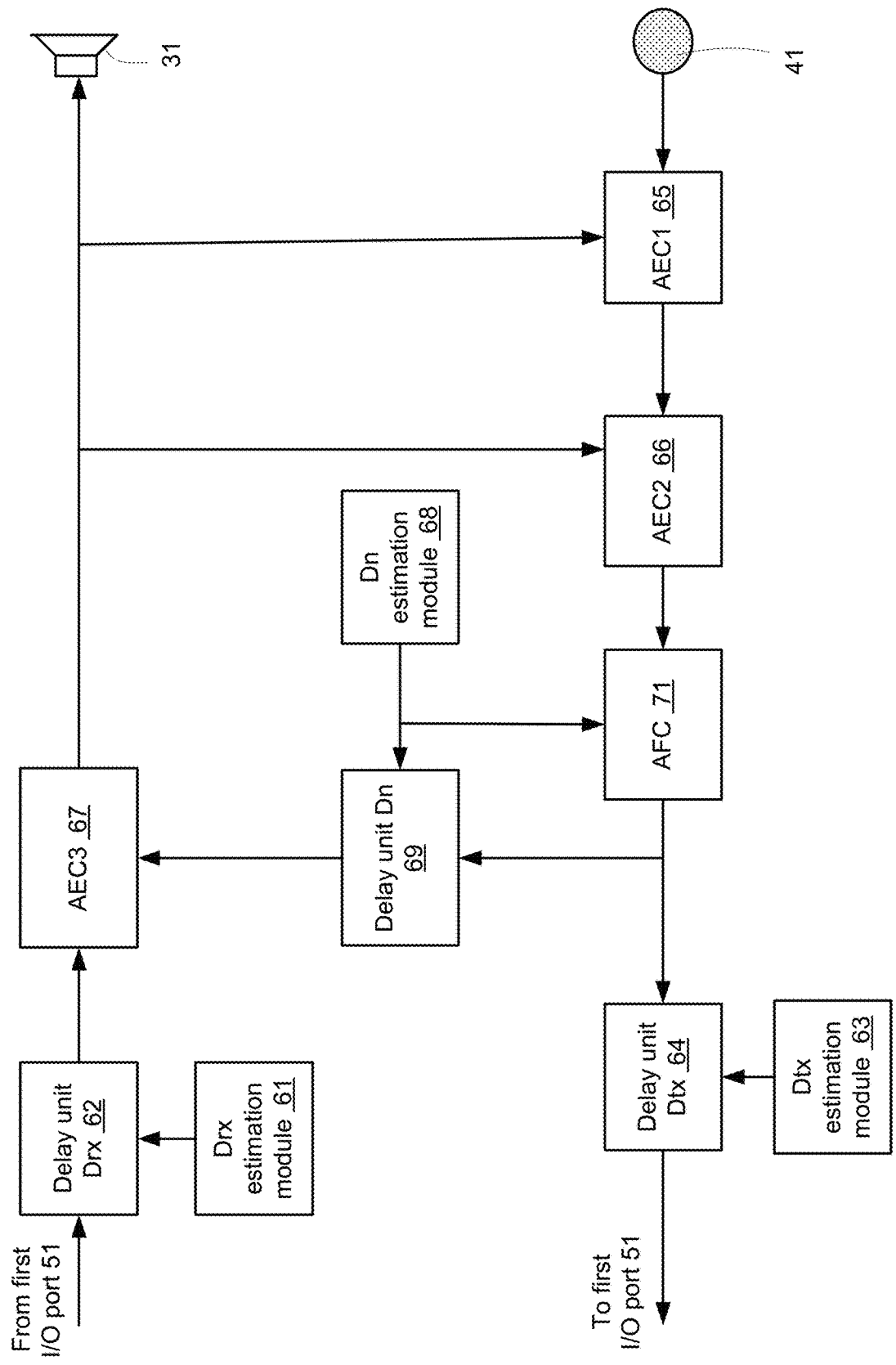
FIG. 9A illustrates various components and one or more compensation modules of a first device of a first person according to an embodiment of the invention.

FIG. 9A illustrates various components (such as first microphone 41 and first speaker 31) and one or more compensation modules AEC1 65, AEC2 66, AFC 71, AEC3 67, Delay unit Dn 69, Delay unit Dtx 64, Delay unit Drx 62, Dn estimation module 68, Dtx estimation module 63 and Drx estimation module 61 of first device 21 according to an embodiment of the invention.

The input of delay unit Drx 62 is fed by first device input digital signals such as signal 1131. Delay unit Drx 62 performs Drx compensation. The duration of Drx can be learnt by Drx estimation module 61 that is coupled to Delay unit Drx 62.

The output of Delay unit Drx 62 is coupled to a first input of AEC3 67. AEC3 67 is also fed by the output of Delay unit Dn 69.

The output of AEC3 67 is fed to first speaker 31.

Delay unit Dn 69 compensates for network delays and is fed by Dn estimation module 68 (that estimates Dn) and by an output of AFC 71.

The output of first microphone 41 is fed to a sequence of three compensation modules that includes AEC1 65, AEC2 66 and AFC 71.

The output of AFC 71 is also fed to Delay unit Dtx 64. Delay unit Dtx 64 performs Dtx compensation and outputs a Dtx compensated signal to first I/O port 51. Delay unit Dtx 64 is also fed by Dtx estimation module 63. Dtx estimation module 63 estimated Dtx.

Figure 9B:
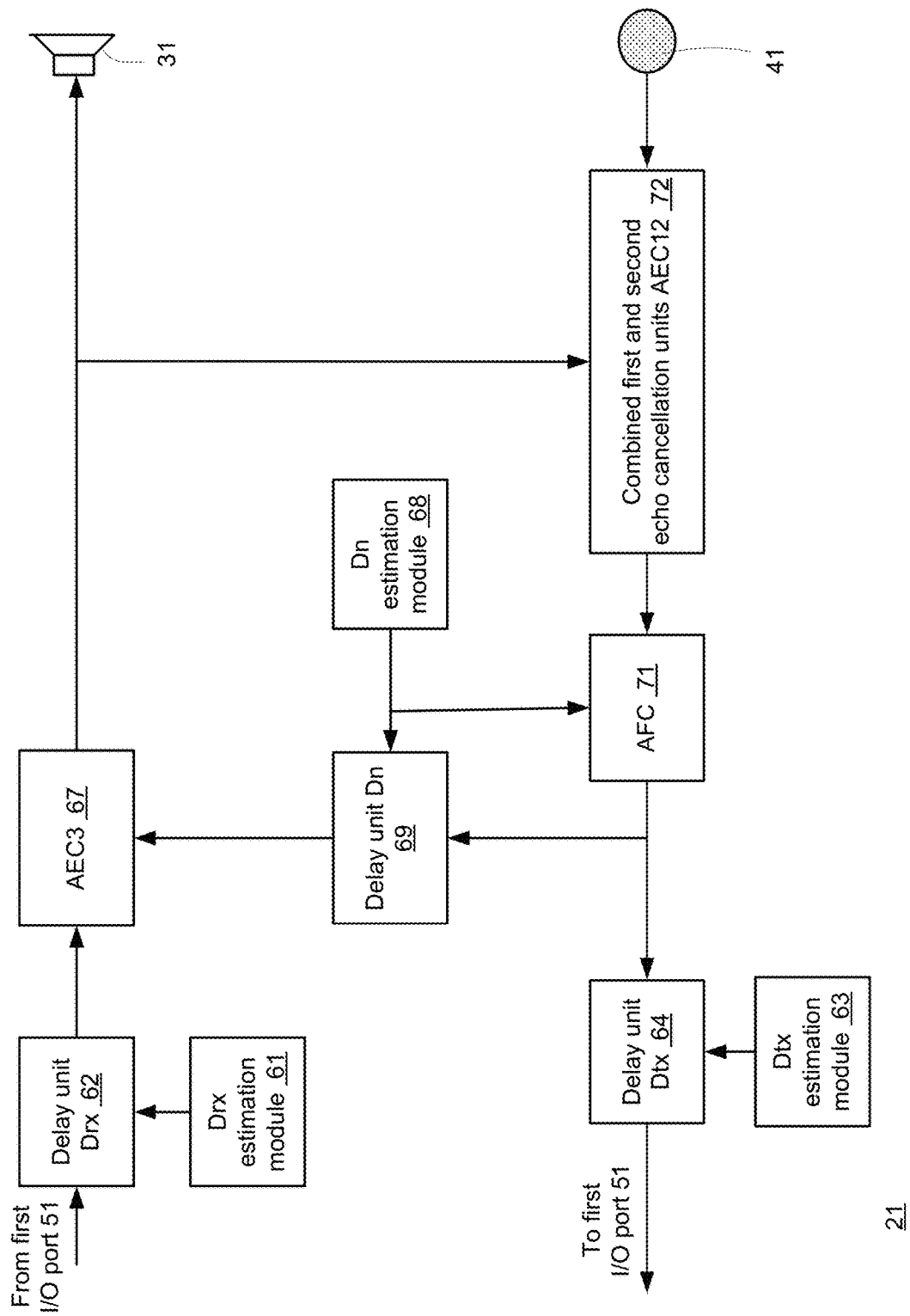
FIG. 9B illustrates various components and one or more compensation modules of a first device of a first person according to an embodiment of the invention.

FIG. 9B illustrates various components (such as first microphone 41 and first speaker 31) and one or more compensation modules of a first device of a first person according to an embodiment of the invention.

FIG. 9B differs from FIG. 9A by including a combined first and second echo cancellation units AEC12 72 instead of the pair of serially coupled AEC1 61 and AEC2 66.

Figure 9C:
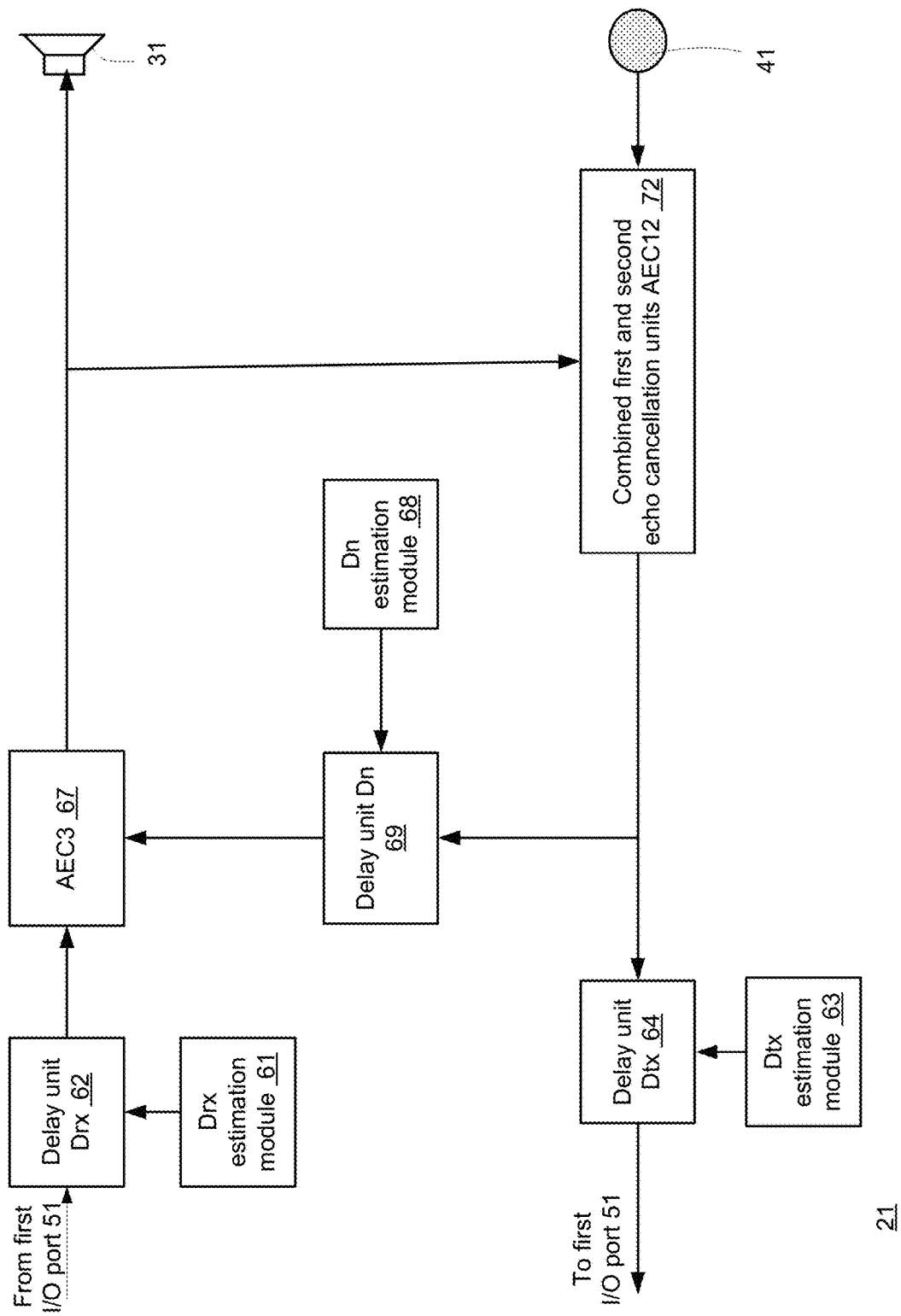
FIG. 9C illustrates various components and one or more compensation modules of a first device of a first person according to an embodiment of the invention.

FIG. 9C illustrates various components (such as first microphone 41 and first speaker 31) and one or more compensation modules of a first device of a first person according to an embodiment of the invention.

FIG. 9C differs from FIG. 9B by not including AFC 71. The output of combined first and second echo cancellation units AEC12 72 is fed to Delay unit Dn 69 and Delay unit Dtx 64.

Figure 9D:
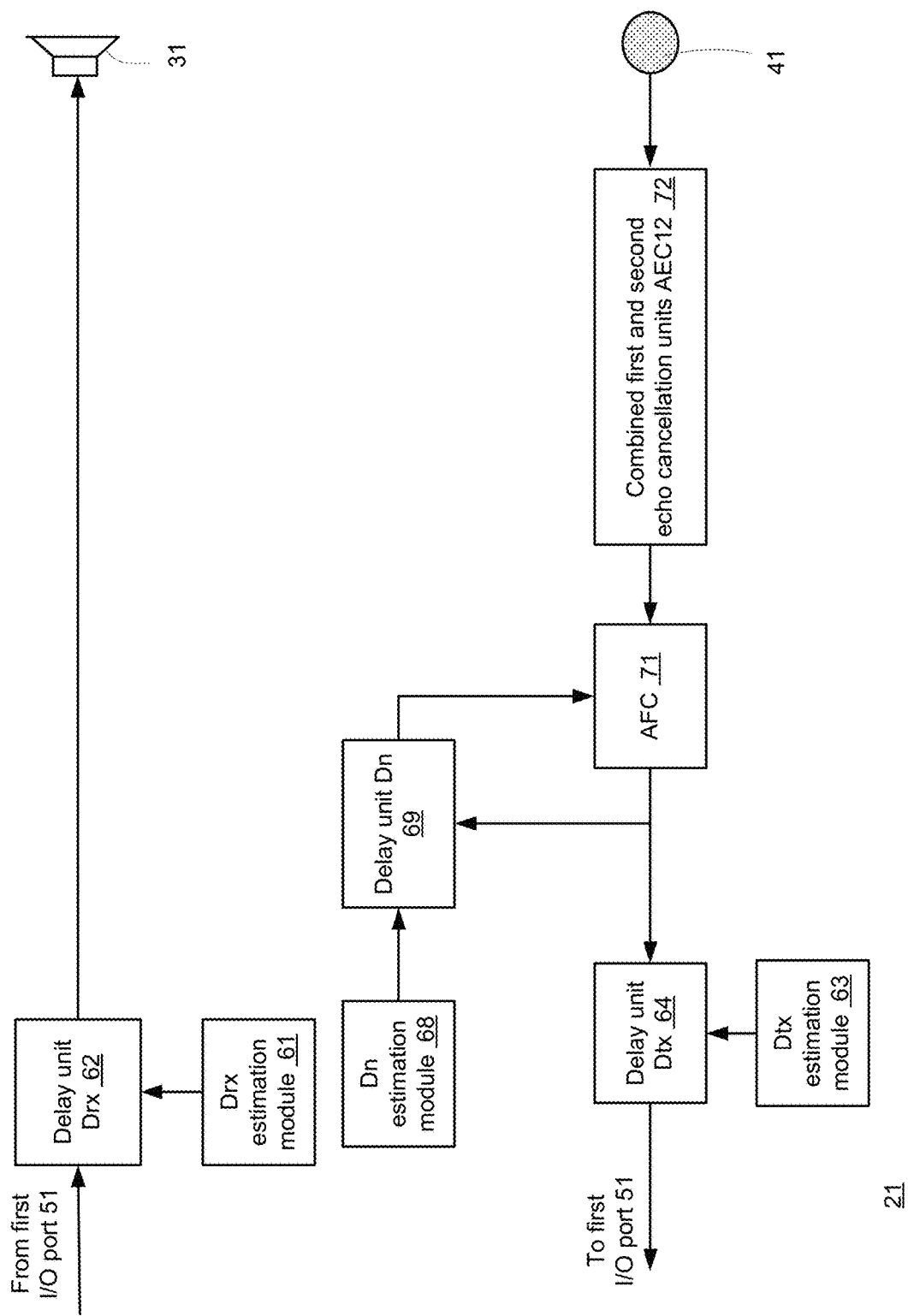
FIG. 9D illustrates various components and one or more compensation modules of a first device of a first person according to an embodiment of the invention.

FIG. 9D illustrates various components (such as first microphone 41 and first speaker 31) and one or more compensation modules (61, 62, 63, 64, 68, 69, 71 and 72) of a first device of a first person according to an embodiment of the invention.

Figure 10A:
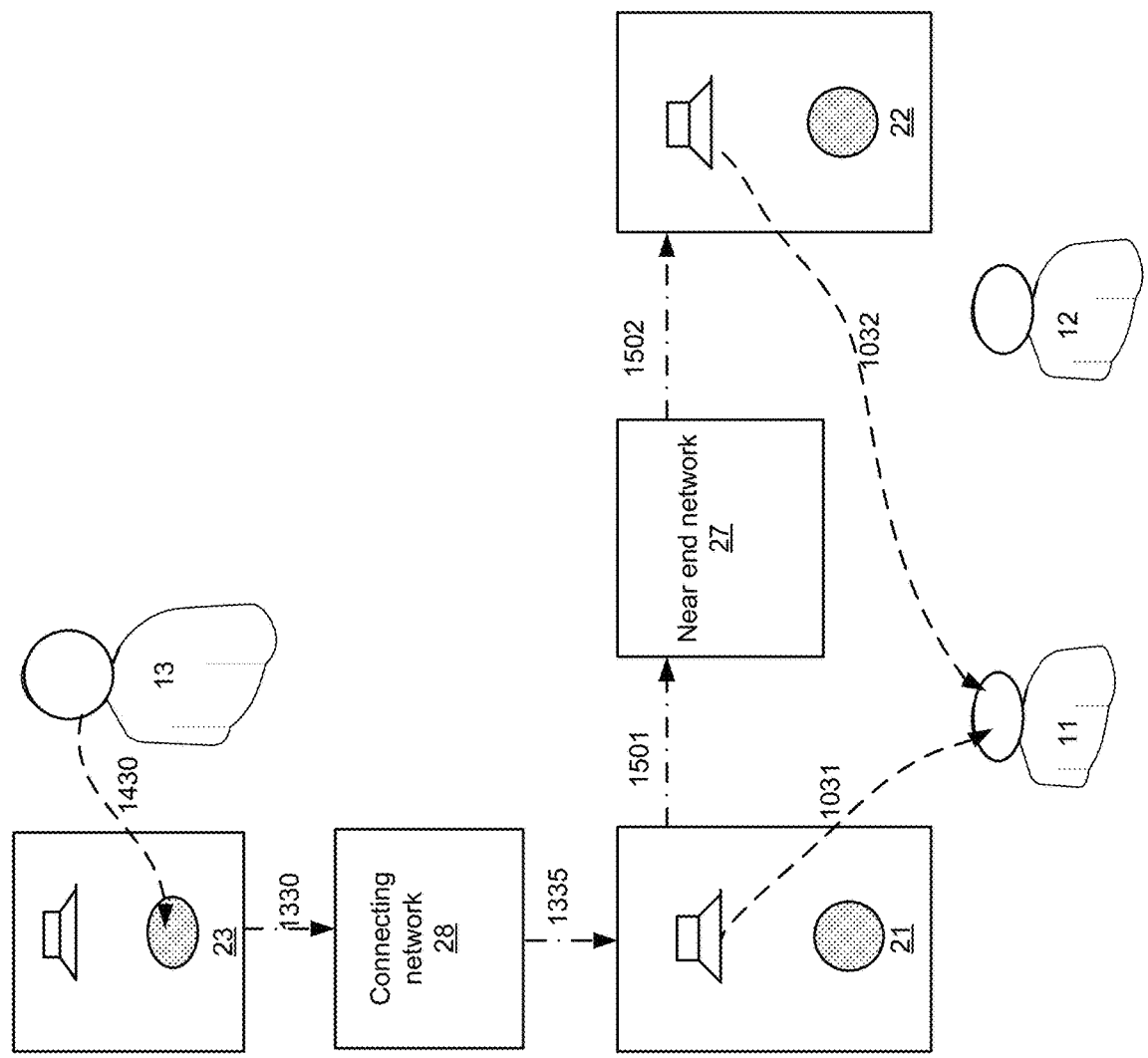
FIG. 10A illustrates a third person that talks during conference call, a near end network, a connecting network, three devices and various signals generated during the conference call according to an embodiment of the invention.

FIG. 10A illustrates a third person that talks during conference call, a near end network, a connecting network, three devices and various signals (1330, 1335, 1031, 1032, 1501 and 1502) generated during the conference call according to an embodiment of the invention.

Figure 10B:
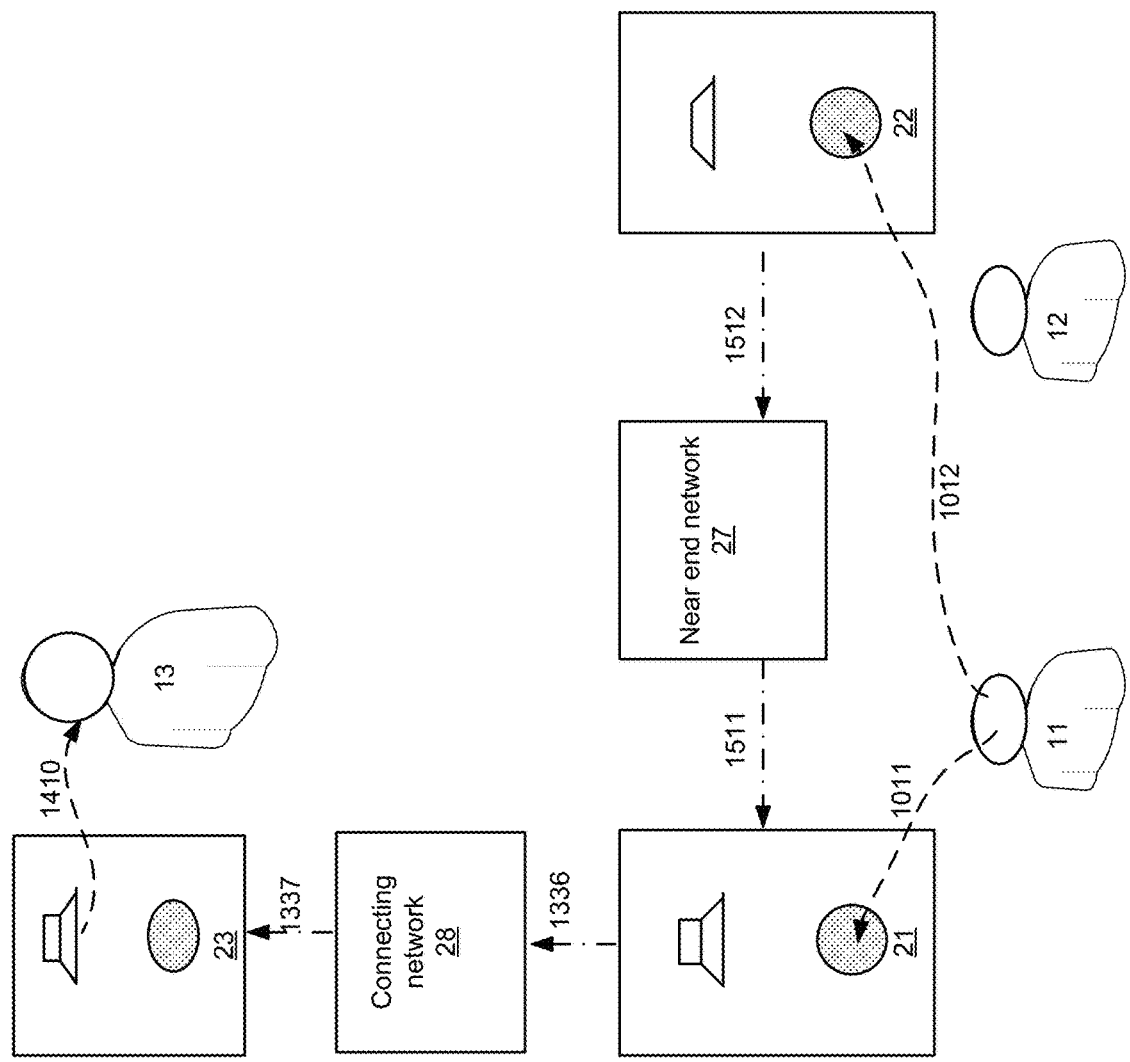
FIG. 10B illustrates a person that talks during conference call, a near end network, a connecting network, three devices and various signals generated during the conference call according to an embodiment of the invention.

FIG. 10B illustrates a person that talks during conference call, a near end network, a connecting network, three devices and various signals (1011, 1012, 1512, 1511, 1336 and 1337) generated during the conference call according to an embodiment of the invention.

Figure 11A:
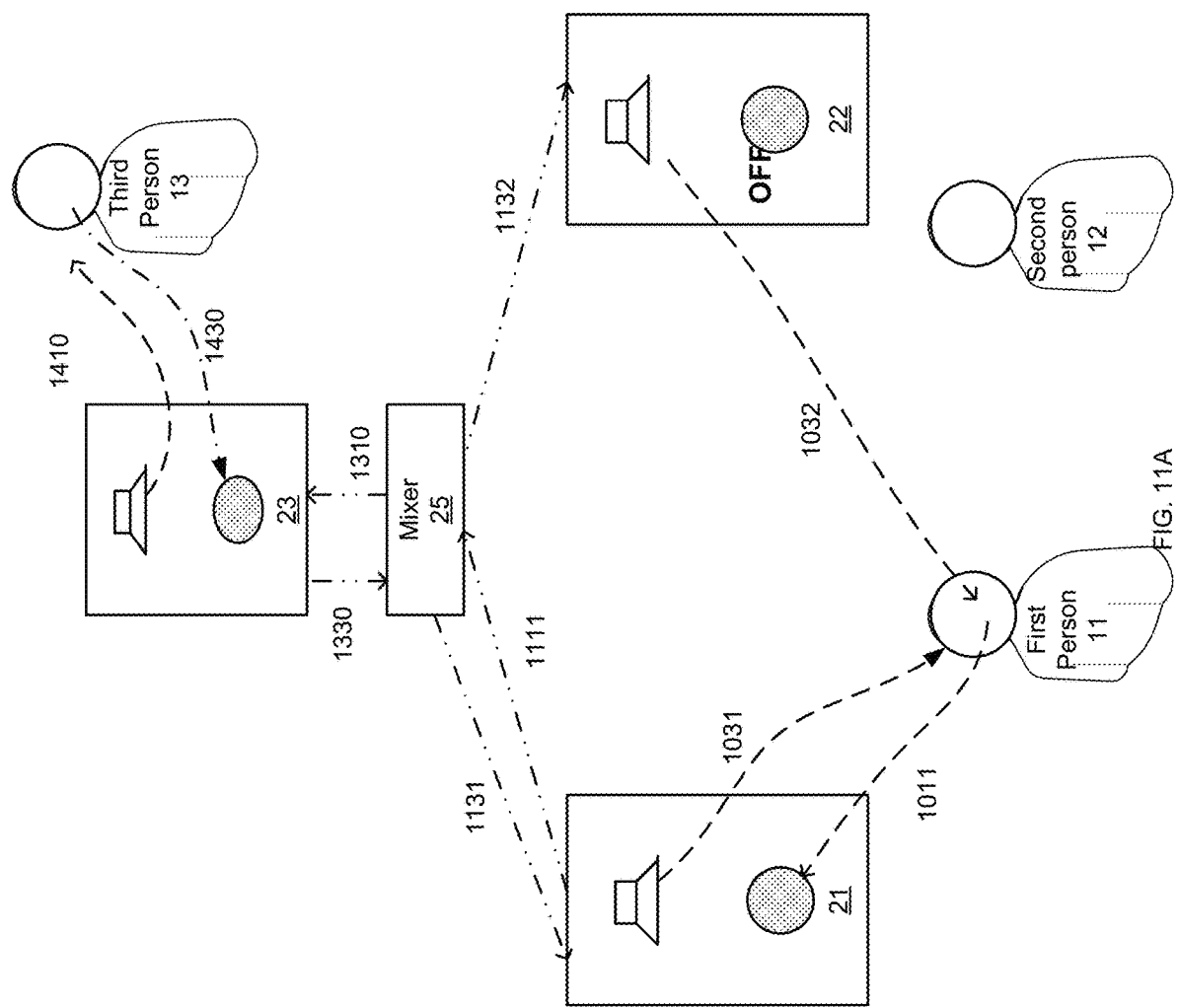
FIG. 11A illustrates a third person and a first person that talk during conference call, a mixer, three devices that include a second device that has a turned off microphone, and various signals generated during the conference call according to an embodiment of the invention.

FIG. 11A illustrates a third person 13 and a first person 11 that talk during conference call, a mixer 25, three devices 21, 22 and 23 that include a second device 22 that has a turned off microphone (OFF), and various signals (1011, 1031, 1032, 1111, 1131, 1132, 1310, 1330, 1410 and 1430) generated during the conference call according to an embodiment of the invention.

Figure 11B:
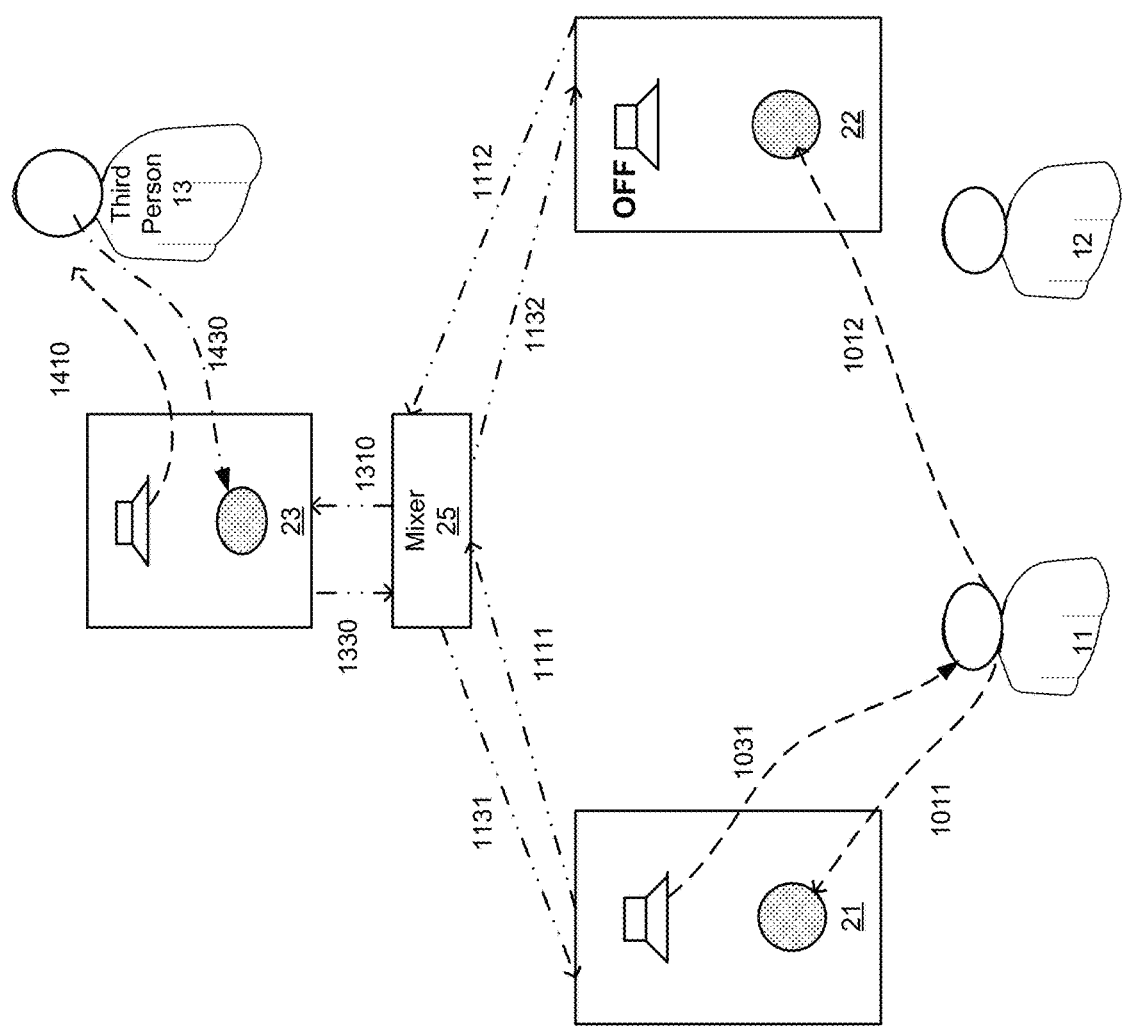
FIG. 11B illustrates a third person and a first person that talk during conference call, a mixer, three devices that include a second device that has a turned off speaker, and various signals generated during the conference call according to an embodiment of the invention.

FIG. 11B illustrates a third person 13 and a first person 11 that talk during conference call, a mixer 25, three devices 21, 22 and 23 that include a second device 22 that has a turned off speaker (OFF), and various signals (1011, 1012, 1031, 1111, 1112, 1131, 1132, 1310, 1330, 1410 and 1430) generated during the conference call according to an embodiment of the invention.

Figure 11C:
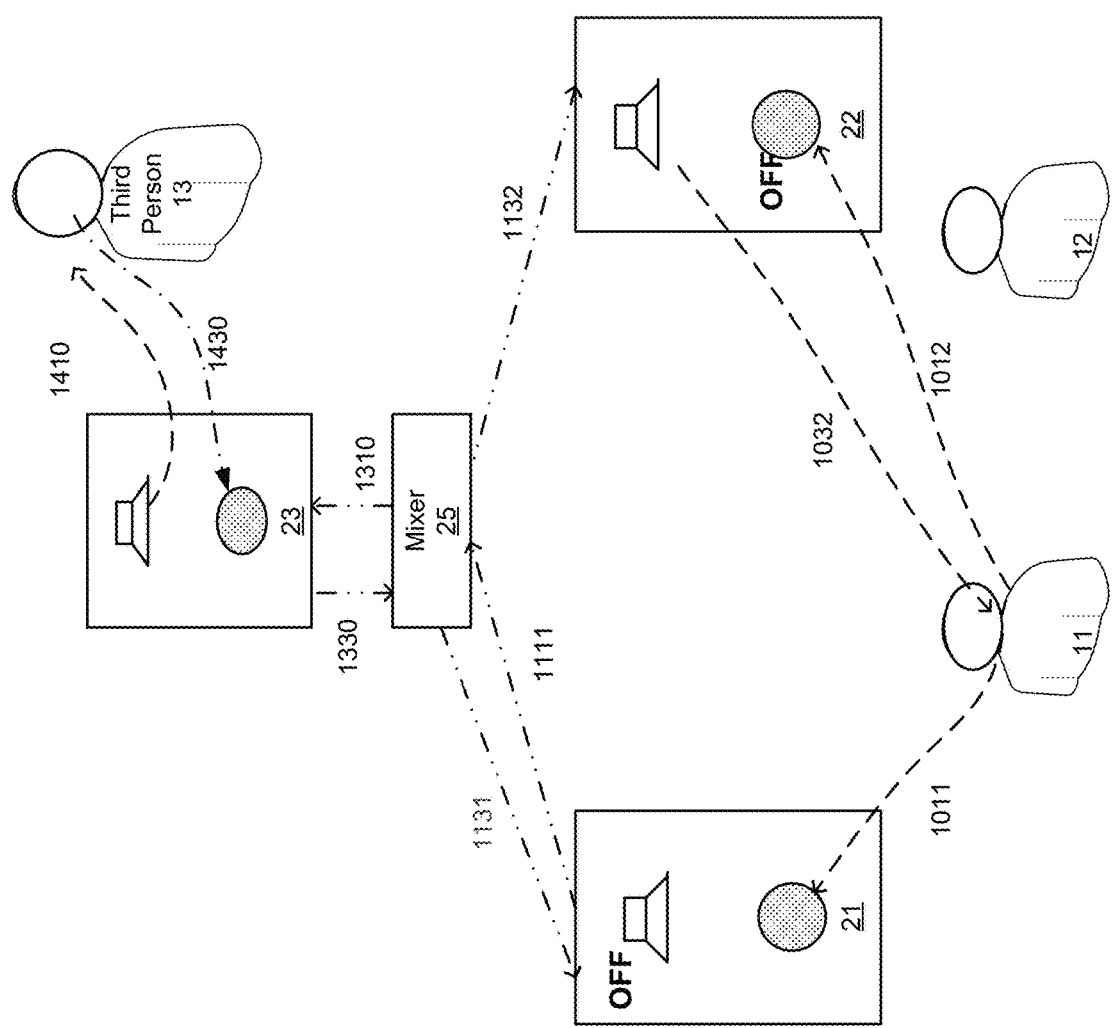
FIG. 11C illustrates a third person and a first person that talk during conference call, a mixer, three devices that include a second device that has a turned off microphone and a first device with a turned off speaker, and various signals generated during the conference call according to an embodiment of the invention.

FIG. 11C illustrates a third person and a first person that talk during conference call, a mixer, three devices that include a second device that has a turned off (OFF) microphone and a first device with a turned off (OFF) speaker, and various signals (1011, 1012, 1032, 1111, 1131, 1132, 1310, 1330, 1410 and 1430) generated during the conference call according to an embodiment of the invention.

Figure 11D:
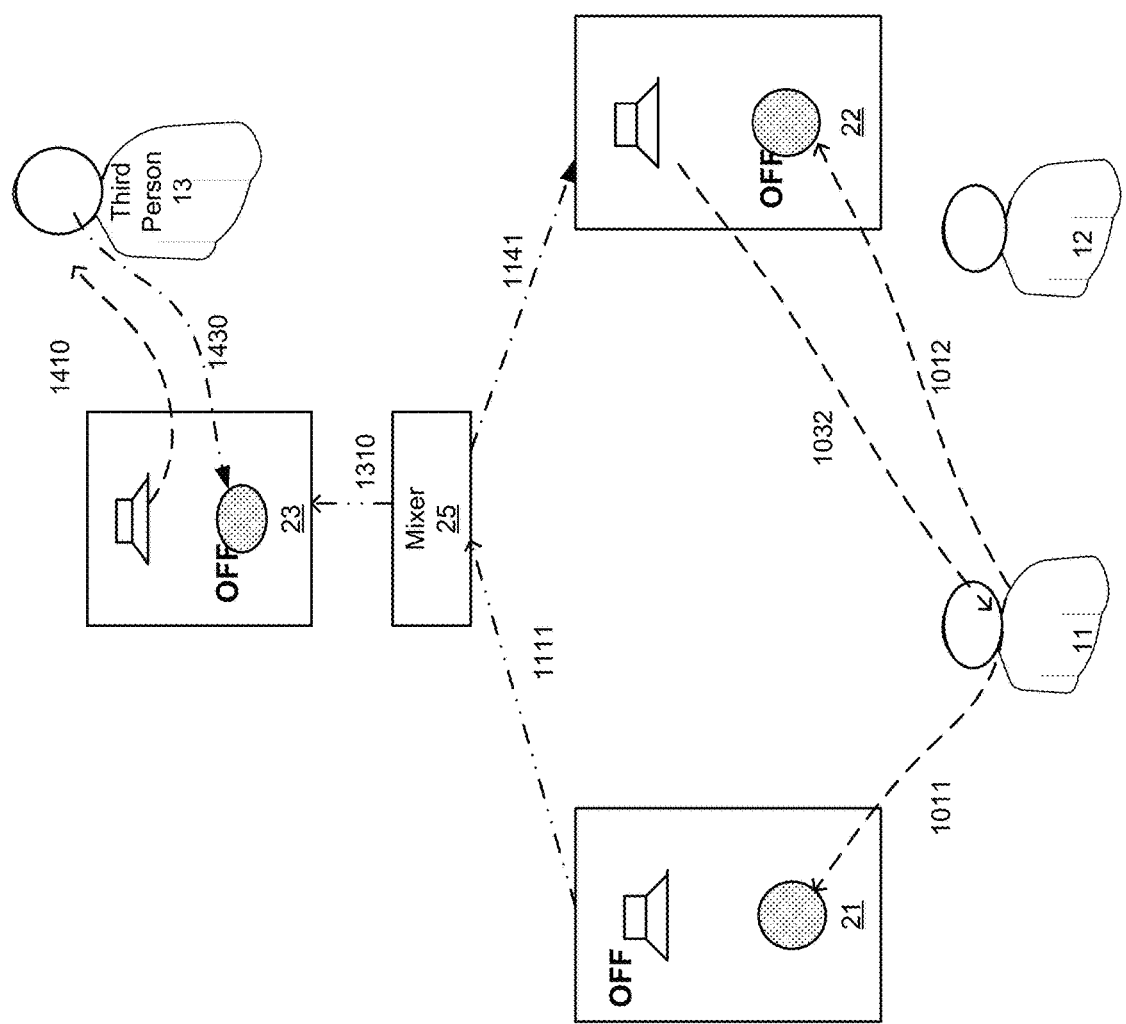
FIG. 11D illustrates a third person and a first person that talk during conference call, a mixer, three devices that include a second device that has a turned off microphone, a third device with a turned off microphone, and a first device with a turned off speaker, as well as various signals generated during the conference call according to an embodiment of the invention.

FIG. 11D illustrates a third person and a first person that talk during conference call, a mixer, three devices that include a second device that has a turned off (OFF) microphone, a third device with a turned off (OFF) microphone, and a first device with a turned off (OFF) speaker, as well as various signals (1011, 1012, 1032, 1111, 1131, 1141, 1310, 1410 and 1430) generated during the conference call according to an embodiment of the invention.

FIG. 12A illustrates a second person that talks during conference call, a mixer, three devices, and various signals (1330, 1601, 1602, 1603, 1604, 1605, 1606, 1607 and 1608) generated during the conference call according to an embodiment of the invention.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A first mobile communication device that comprises:
   a first microphone;
   a first speaker; and
   a first delay unit;
   wherein the first microphone is configured to (i) receive, during a conference call, a first user first microphone signal from a first user, and (ii) output a first microphone digital signal to the first delay unit; wherein the first user first microphone signal represents audio content outputted by the first user;
   wherein the first delay unit is configured to delay, by a delay period, the first microphone digital signal to provide a delayed first user first device digital signal;
   wherein the first mobile communication device is configured to output, to a mixer, the delayed first user first device digital signal;
   wherein the delay period is determined based on measurements executed by at least one mobile communication device out of the first mobile communication device, a second mobile communication device and a third mobile communication device; and
   wherein the mixer is in communication with the first mobile communication device, the second mobile communication device, and the third mobile communication device.

2. The first mobile communication device according to claim 1, wherein the delay period is determined by the third mobile communication device; wherein the first mobile communication device is configured to receive delay period information from the third mobile communication device, wherein the delay period information is indicative of a duration of the delay period.

3. The first mobile communication device according to claim 2, wherein the delay period information is determined by the third mobile communication device based on a delay between (i) a non-delayed first user first digital output signal that was outputted by the first mobile communication device before a provision of the delayed first user first device digital signal, and (ii) a first user second device digital output signal that is outputted to the mixer by the second mobile communication device; wherein the first user second device digital output signal is generated in response to a reception of the audio content outputted by the first user, by a second microphone of the second mobile communication device.

4. The first mobile communication device according to claim 1 wherein the first mobile communication device is configured to determine the delay period.

5. The first mobile communication device according to claim 4 wherein the first mobile communication device is configured to determine the delay period based on a delay between (i) a non-delayed first user first digital output signal that was outputted by the first mobile communication device before a provision of the delayed first user first device digital signal, and (ii) a first user second device digital output signal that is outputted to the mixer by the second mobile communication device.

6. The first mobile communication device according to claim 4, wherein the first mobile communication device is configured to estimate the delay period based on a delay between different cross echoes received by the first microphone;
   wherein the different cross echoes are generated by different speakers, the different speakers comprise the first speaker and a second speaker of the second mobile communication device;
   wherein the different cross echoes are generated as a result of receptions, by the first mobile communication device and the second mobile communication device, of third user digital signals; and
   wherein the third user digital signals represent audio content outputted by a third user.

7. The first mobile communication device according to claim 6, wherein the different cross echoes comprise a third user second cross echo that is generated by a second speaker of the second mobile communication device in response to a reception, by the third mobile communication device, of a third user second device digital input signal.

8. The first mobile communication device according to claim 6, wherein the different cross echoes comprise a cross echo outputted from the first speaker in response to a reception, by the first mobile communication device, of a third user first device digital input signal.

9. The first mobile communication device according to claim 1, wherein the delay period is determined by the second mobile communication device, wherein the first mobile communication device is configured to receive, from the second mobile communication device, delay period information that is indicative of a duration of the delay period.

10. A method for participating in a conference call, the method comprises:
    receiving a first user first microphone signal from a first user, by a first microphone of a first mobile communication device and during the conference call;

outputting, by the first microphone, a first microphone digital signal to a first delay unit of the first mobile communication device; wherein the first user first microphone signal represents audio content outputted by the first user;

delaying the first microphone digital signal, by the first delay unit and by a delay period, to provide a delayed first user first device digital signal; wherein the delay period is determined based on measurements executed by at least one mobile communication device out of the first mobile communication device, a second mobile communication device and a third mobile communication device; and outputting, by the first mobile communication device, the delayed first user first device digital signal to a mixer; wherein the mixer is in communication with the first mobile communication device, the second mobile communication device, and the third mobile communication device.

11. The method according to claim 10, comprising receiving, by the first mobile communication device, delay period information indicative of a duration of the delay period, wherein the delay period is determined by the third mobile communication device.

12. The method according to claim 11, wherein the delay period information is determined by the third mobile communication device based on a delay between (i) a non-delayed first user first digital output signal that was outputted by the first mobile communication device before a provision of the delayed first user first device digital signal, and (ii) a first user second device digital output signal that is outputted to the mixer by the second mobile communication device; and wherein the first user second device digital output signal is generated in response to a reception of the audio content outputted by the first user, by a second microphone of the second mobile communication device.

13. The method according to claim 10, comprising determining the delay period by the first mobile communication device.

14. The method according to claim 13, wherein the determining of the delay period by the first mobile communication device is based on a delay between (i) non-delayed first user first digital output signal that was outputted by the first mobile communication device before a provision of the delayed first user first device digital signal, and (ii) a first user second device digital output signal that is outputted to the mixer by the second mobile communication device.

15. The method according to claim 13, wherein the determining of the delay period by the first mobile communication device is based on a delay between different cross echoes received by the first microphone;

wherein the different cross echoes are generated by different speakers, the different speakers comprise a first speaker of the first mobile communication device and a second speaker of the second mobile communication device;

wherein the different cross echoes are generated as a result of receptions, by the first mobile communication device and the second mobile communication device, of third user digital signals; and wherein the third user digital signals represent audio content outputted by a third user.

16. The method according to claim 15, wherein the different cross echoes comprise a third user second cross echo that is generated by a second speaker of the second mobile communication device in response to a reception, by the third mobile communication device, of a third user second device digital input signal.

17. The method according to claim 15, wherein the different cross echoes comprise a cross echo outputted from the first speaker in response to a reception, by the first mobile communication device, of a third user first device digital input signal.

18. The method according to claim 10, wherein the delay period is determined by the second mobile communication device.

19. A non-transitory computer readable medium that stores instructions for participating in a conference call, the instructions causing a first mobile communication device to:
receive by a first microphone of the first mobile communication device, during the conference call, a first user first microphone signal from a first user;
output, by the first microphone, a first microphone digital signal to a first delay unit of the first mobile communication device; wherein the first user first microphone signal represents audio content outputted by the first user;
delay, by the first delay unit and by a delay period, the first microphone digital signal to provide a delayed first user first device digital signal; wherein the delay period is determined based on measurements executed by at least one mobile communication device out of the first mobile communication device, a second mobile communication device and a third mobile communication device; and
output, by the first mobile communication device, the delayed first user first device digital signal to a mixer; wherein the mixer is in communication with the first mobile communication device, the second mobile communication device, and the third mobile communication device.

20. The non-transitory computer readable medium according to claim 19 that also stores instructions causing the first mobile communication device to estimate the delay period based on a delay between (i) a non-delayed first user first digital output signal that was outputted by the first mobile communication device before a provision of the delayed first user first device digital signal, and (ii) a first user second device digital output signal that is outputted to the mixer by the second mobile communication device.

* * * * *